(12) United States Patent
Wang et al.

(10) Patent No.: US 12,213,127 B2
(45) Date of Patent: Jan. 28, 2025

(54) SPATIAL REUSE FOR SIDELINK COMMUNICATIONS

(71) Applicant: QUALCOMM Incorporated, San Diego, CA (US)

(72) Inventors: Xiaojie Wang, Hillsborough, NJ (US);
Yisheng Xue, San Diego, CA (US);
Piyush Gupta, Bridgewater, NJ (US);
Jing Sun, San Diego, CA (US);
Xiaoxia Zhang, San Diego, CA (US);
Lik Hang Silas Fong, Bridgewater, NJ (US)

(73) Assignee: QUALCOMM Incorporated, San Diego, CA (US)

(*) Notice: Subject to any disclaimer, the term of this patent is extended or adjusted under 35 U.S.C. 154(b) by 517 days.

(21) Appl. No.: 17/474,622

(22) Filed: Sep. 14, 2021

(65) Prior Publication Data

US 2022/0095327 A1  Mar. 24, 2022

Related U.S. Application Data

(60) Provisional application No. 63/082,293, filed on Sep. 23, 2020.

(51) Int. Cl.
*H04W 24/00*  (2009.01)
*H04L 1/00*  (2006.01)
*H04W 24/08*  (2009.01)
*H04W 28/26*  (2009.01)
*H04W 72/1263*  (2023.01)
*H04W 72/20*  (2023.01)

(52) U.S. Cl.
CPC ....... *H04W 72/1263* (2013.01); *H04L 1/0003* (2013.01); *H04W 24/08* (2013.01); *H04W 28/26* (2013.01); *H04W 72/20* (2023.01)

(58) Field of Classification Search
None
See application file for complete search history.

(56) References Cited

U.S. PATENT DOCUMENTS

| | | | | |
|---|---|---|---|---|
| 2016/0212596 | A1* | 7/2016 | Brahmi | H04W 72/20 |
| 2020/0128527 | A1* | 4/2020 | Muraoka | H04W 72/51 |
| 2020/0228247 | A1* | 7/2020 | Guo | H04W 52/383 |
| 2020/0413348 | A1* | 12/2020 | Ryu | H04W 48/12 |
| 2021/0368533 | A1* | 11/2021 | Sartori | H04W 72/20 |
| 2022/0182989 | A1* | 6/2022 | Lee | H04W 72/04 |

\* cited by examiner

*Primary Examiner* — Abdelillah Elmejjarmi
(74) *Attorney, Agent, or Firm* — Holland & Hart LLP

(57) ABSTRACT

Methods, systems, and devices for wireless communication are described. Generally, the described techniques provide for a first user equipment (UE) to manage the reuse of resources reserved for sidelink communications by the UE. The first UE may identify scheduling information for a sidelink shared channel between the first UE and a second UE, and the first UE may reserve a set of resources for subsequent sidelink communications by the first UE. The first UE may transmit a sidelink control message indicating the scheduling information and the reserved resources to one or more neighboring UEs. The sidelink control message may include a reuse allowance indicator that may indicate whether the set of reserved resources is available for spatial reuse by the neighboring UEs. The neighboring UEs may determine whether the reuse the reserved resources based on the control message, the reuse allowance indicator, or both.

30 Claims, 15 Drawing Sheets

SPATIAL REUSE FOR SIDELINK COMMUNICATIONS

CROSS REFERENCE

The present application for patent claims the benefit of U.S. Provisional Patent Application No. 63/082,293 by WANG et al., entitled "SPATIAL REUSE FOR SIDELINK COMMUNICATIONS," filed Sep. 23, 2020, assigned to the assignee hereof, and expressly incorporated by reference herein.

FIELD OF TECHNOLOGY

The following relates to wireless communication, including spatial reuse for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a transmitting UE may transmit sidelink control information (SCI) to schedule a sidelink message between the transmitting UE and one or more receiving UEs. The SCI may indicate resources that are reserved by the transmitting UE, which may be used for subsequent communications or retransmissions. In some cases, neighboring UEs may receive the SCI and determine to reuse the reserved resources. However, the spatial reuse of the reserved resources by a neighboring UE may interfere with the communications scheduled by the transmitting UE, which may lead to increased interference, decreased network throughput, and reduced quality of the communications.

SUMMARY

The described techniques relate to improved methods, systems, devices, and apparatuses that support spatial reuse for sidelink communications. Generally, the described techniques provide for a transmitting user equipment (UE) to manage the reuse of resources reserved for sidelink communications by the UE. For example, a first UE (e.g., a transmitting UE) may identify scheduling information for communications on a sidelink shared channel between the first UE and a second UE. The first UE may reserve a set of resources for subsequent sidelink communications, such as retransmissions by the first UE. In some examples, one or more neighboring UEs may attempt to reuse the reserved resources. As described herein, the first UE may transmit a sidelink control message to the one or more neighboring UEs to manage the reuse of the reserved resources. The sidelink control message may include an indication of the scheduling information, an indication of the reserved resources, a reuse allowance indicator, or a combination thereof. The reuse allowance indicator may indicate whether the set of reserved resources is available for spatial reuse by a neighboring UE, a group of neighboring UEs, or all neighboring UEs. In some examples, the control message may include a set of spatial reuse parameters associated with the reuse of the reserved resources. The one or more neighboring UEs may receive the sidelink control message, and the neighboring UEs may determine whether to reuse the reserved resources based on the reuse allowance indication, the spatial reuse parameters, one or more measurements performed by the neighboring UEs, or a combination thereof to reduce interference and improve throughput associated with sidelink communications.

A method of wireless communication at a first UE is described. The method may include identifying scheduling information for a sidelink shared channel between the first UE and a second UE and transmitting a sidelink control message indicating scheduling information and a set of reserved resources for subsequent sidelink communications for the first UE, where the sidelink control message includes a reuse allowance indicator that indicates whether the set of reserved resources is available for spatial reuse by one or more UEs.

An apparatus for wireless communication at a first UE is described. The apparatus may include a processor, memory coupled with the processor, and instructions stored in the memory. The instructions may be executable by the processor to cause the apparatus to identify scheduling information for a sidelink shared channel between the first UE and a second UE and transmit a sidelink control message indicating scheduling information and a set of reserved resources for subsequent sidelink communications for the first UE, where the sidelink control message includes a reuse allowance indicator that indicates whether the set of reserved resources is available for spatial reuse by one or more UEs.

Another apparatus for wireless communication at a first UE is described. The apparatus may include means for identifying scheduling information for a sidelink shared channel between the first UE and a second UE and transmitting a sidelink control message indicating scheduling information and a set of reserved resources for subsequent sidelink communications for the first UE, where the sidelink control message includes a reuse allowance indicator that indicates whether the set of reserved resources is available for spatial reuse by one or more UEs.

A non-transitory computer-readable medium storing code for wireless communication at a first UE is described. The code may include instructions executable by a processor to identify scheduling information for a sidelink shared channel between the first UE and a second UE and transmit a sidelink control message indicating scheduling information and a set of reserved resources for subsequent sidelink communications for the first UE, where the sidelink control message includes a reuse allowance indicator that indicates whether the set of reserved resources is available for spatial reuse by one or more UEs.

Some examples of the method, apparatuses, and non-transitory computer-readable medium described herein may further include operations, features, means, or instructions for determining the reuse allowance indicator based on a priority of the sidelink shared channel, a modulation and coding scheme (MCS) of the scheduling information, a position of the one or more UEs, or any combination thereof.

In some examples of the method, apparatuses, and non-transitory computer-readable medium described herein, the reuse allowance indicator may indicate a first set of transmit power parameters for reuse of the set of reserved resources according to a first receive power threshold and a second set of transmit power parameters for reuse of the set of reserved resources according to a second receive power threshold, and each of the first and second sets of transmit power parameters may include an allowed interference parameter and a margin parameter.

In some examples of the method, apparatuses, and non-transitory computer-readable medium described herein, the first and second sets of transmit power parameters may be based on a coverage difference between the sidelink control message and the sidelink shared channel.

Some examples of the method, apparatuses, and non-transitory computer-readable medium described herein may further include operations, features, means, or instructions for identifying one or more groups of UEs, where each of the one or more groups of UEs may be configured a respective set of spatial reuse rules for reusing the set of reserved resources.

In some examples of the method, apparatuses, and non-transitory computer-readable medium described herein, the reuse allowance indicator may include different sets of spatial reuse parameters for each of the one or more groups of UEs.

Some examples of the method, apparatuses, and non-transitory computer-readable medium described herein may further include operations, features, means, or instructions for transmitting an indication of a zone identifier (ID) for a zone of the first UE, where the indication of the zone ID may be included in the sidelink control message or a second sidelink control message, and where the reuse allowance indicator may be based on the zone of the first UE.

Some examples of the method, apparatuses, and non-transitory computer-readable medium described herein may further include operations, features, means, or instructions for transmitting an indication of a zone ID for a zone of the second UE based on a location of the second UE, where the indication of the zone ID may be included in the sidelink control message or a second sidelink control message, and where the reuse allowance indicator is based on the zone of the second UE.

Some examples of the method, apparatuses, and non-transitory computer-readable medium described herein may further include operations, features, means, or instructions for transmitting the sidelink shared channel to the second UE in accordance with the scheduling information, receiving a feedback message from the second UE for the sidelink shared channel, and updating a set of spatial reuse parameters for reusing the set of reserved resources based on the feedback message from the second UE.

In some examples of the method, apparatuses, and non-transitory computer-readable medium described herein, the reuse allowance indicator may include a set of bits indicating whether the set of reserved resources may be available for spatial reuse by one or more UEs. In some examples of the method, apparatuses, and non-transitory computer-readable medium described herein, the set of bits may indicate a set of transmit power parameters for the set of reserved resources available for spatial reuse.

Some examples of the method, apparatuses, and non-transitory computer-readable medium described herein may further include operations, features, means, or instructions for transmitting a set of spatial reuse parameters in a second sidelink control message after transmitting the sidelink control message, the set of spatial reuse parameters including a zone ID of the first UE or the second UE, a maximum transmit power for spatial reuse, a transmit power offset, and group information for one or more groups of UEs for reusing the set of reserved resources. In some examples of the method, apparatuses, and non-transitory computer-readable medium described herein, the second sidelink control message may be associated with a format specific to sidelink spatial reuse.

Some examples of the method, apparatuses, and non-transitory computer-readable medium described herein may further include operations, features, means, or instructions for transmitting a set of spatial reuse parameters in the sidelink shared channel, the set of spatial reuse parameters including a zone ID of the first UE or the second UE, a maximum transmit power for spatial reuse, and group information for one or more groups of UEs for reusing the set of reserved resources. In some examples of the method, apparatuses, and non-transitory computer-readable medium described herein, the set of spatial reuse parameters may be indicated by a spatial reuse information element (IE) in the sidelink shared channel.

A method of wireless communications at a third UE is described. The method may include monitoring a set of sidelink resources for a sidelink control message from a first UE, receiving the sidelink control message from the first UE based on the monitoring, where the sidelink control message includes a set of reserved resources for a sidelink shared channel between the first UE and a second UE, and a reuse allowance indicator that indicates whether the set of reserved resources is available for spatial reuse by the third UE, and performing a sidelink communication based on the reuse allowance indicator.

An apparatus for wireless communications at a third UE is described. The apparatus may include a processor, memory coupled with the processor, and instructions stored in the memory. The instructions may be executable by the processor to cause the apparatus to monitor a set of sidelink resources for a sidelink control message from a first UE, receive the sidelink control message from the first UE based on the monitoring, where the sidelink control message includes a set of reserved resources for a sidelink shared channel between the first UE and a second UE, and a reuse allowance indicator that indicates whether the set of reserved resources is available for spatial reuse by the third UE, and perform a sidelink communication based on the reuse allowance indicator.

Another apparatus for wireless communications at a third UE is described. The apparatus may include means for monitoring a set of sidelink resources for a sidelink control message from a first UE, receiving the sidelink control message from the first UE based on the monitoring, where the sidelink control message includes a set of reserved resources for a sidelink shared channel between the first UE and a second UE, and a reuse allowance indicator that indicates whether the set of reserved resources is available for spatial reuse by the third UE, and performing a sidelink communication based on the reuse allowance indicator.

A non-transitory computer-readable medium storing code for wireless communications at a third UE is described. The code may include instructions executable by a processor to monitor a set of sidelink resources for a sidelink control message from a first UE, receive the sidelink control message from the first UE based on the monitoring, where the sidelink control message includes a set of reserved resources for a sidelink shared channel between the first UE and a second UE, and a reuse allowance indicator that indicates whether the set of reserved resources is available for spatial reuse by the third UE, and perform a sidelink communication based on the reuse allowance indicator.

Some examples of the method, apparatuses, and non-transitory computer-readable medium described herein may further include operations, features, means, or instructions for refraining from performing a communication via the set of reserved resources based on determining that the set of reserved resources may be unavailable for spatial reuse, the determining based on the reuse allowance indicator, where the sidelink communication is performed using a set of resources different from the set of reserved resources.

Some examples of the method, apparatuses, and non-transitory computer-readable medium described herein may further include operations, features, means, or instructions for determining that the set of reserved resources may be unavailable based on the sidelink communication having a lower priority than the sidelink shared channel.

Some examples of the method, apparatuses, and non-transitory computer-readable medium described herein may further include operations, features, means, or instructions for determining that the set of reserved resources may be unavailable based on the third UE being in a different group than the first UE or the second UE.

Some examples of the method, apparatuses, and non-transitory computer-readable medium described herein may further include operations, features, means, or instructions for determining that the set of reserved resources may be unavailable based on a zone ID of the third UE, a zone ID of the first UE, a zone ID of the second UE, or a combination thereof, where the zone ID of the first UE or the zone ID of the second UE may be included in the sidelink control message.

Some examples of the method, apparatuses, and non-transitory computer-readable medium described herein may further include operations, features, means, or instructions for performing the sidelink communication using the set of reserved resources based on determining that the set of reserved resources may be available for spatial reuse, where the determining is based on the reuse allowance indicator and the sidelink communication having a higher priority than the sidelink shared channel.

In some examples of the method, apparatuses, and non-transitory computer-readable medium described herein, the reuse allowance indicator may indicate a first set of transmit power parameters for reuse of the set of reserved resources according to a first receive power threshold and a second set of transmit power parameters for reuse of the set of reserved resources according to a second receive power threshold, and a set of transmit power parameters for the sidelink communication is based on the reuse allowance indicator and one or more measurements of the third UE.

In some examples of the method, apparatuses, and non-transitory computer-readable medium described herein, the set of transmit power parameters is determined based on a coverage difference between the sidelink control message and the sidelink shared channel.

Some examples of the method, apparatuses, and non-transitory computer-readable medium described herein may further include operations, features, means, or instructions for selecting a set of resources for performing the sidelink communication based on a set of receive power thresholds for spatial reuse. In some examples of the method, apparatuses, and non-transitory computer-readable medium described herein, the set of resources at least partially overlaps the set of reserved resources, each of the set of receive power thresholds corresponds to a respective set of transmit power parameters and the sidelink communication may be performed based on the respective sets of transmit power parameters.

Some examples of the method, apparatuses, and non-transitory computer-readable medium described herein may further include operations, features, means, or instructions for identifying a group of the first UE based on the sidelink control message or a second sidelink control message from the first UE, and selecting a set of resources for performing the sidelink communication based on the group of the first UE. In some examples of the method, apparatuses, and non-transitory computer-readable medium described herein, the set of resources at least partially overlaps the set of reserved resources based on the third UE being in a same group as the first UE.

Some examples of the method, apparatuses, and non-transitory computer-readable medium described herein may further include operations, features, means, or instructions for transmitting, to the first UE, a request to join the group of the first UE, and receiving, from the first UE or a group leader of the group of the first UE, a response indicating the third UE to join the group of the first UE.

Some examples of the method, apparatuses, and non-transitory computer-readable medium described herein may further include operations, features, means, or instructions for identifying a zone ID associated with the first UE or the second UE based on the sidelink control message or a second sidelink control message from the first UE, and selecting a set of resources for performing the sidelink communication based on a zone of the third UE and the zone ID associated with the first UE or the second UE, the zone of the third UE based on a location of the third UE.

Some examples of the method, apparatuses, and non-transitory computer-readable medium described herein may further include operations, features, means, or instructions for estimating a distance between the third UE and the first UE based on the sidelink control message and performing the sidelink communication in accordance with a set of transmit power parameters, the set of transmit power parameters based on the distance.

Some examples of the method, apparatuses, and non-transitory computer-readable medium described herein may further include operations, features, means, or instructions for receiving a set of spatial reuse parameters in a second sidelink control message after receiving the sidelink control message, the set of spatial reuse parameters including a zone ID of the first UE or the second UE, a maximum transmit power for spatial reuse, a transmit power offset, group information for one or more groups of UEs for reusing the set of reserved resources, and performing the sidelink communication in accordance with the set of spatial reuse parameters using a set of resources that at least partially overlaps with the set of reserved resources.

Some examples of the method, apparatuses, and non-transitory computer-readable medium described herein may further include operations, features, means, or instructions for receiving a set of spatial reuse parameters in the sidelink shared channel, the set of spatial reuse parameters including a zone ID of the first UE or the second UE, a maximum transmit power for spatial reuse, group information for one or more groups of UEs for reusing the set of reserved resources, and performing the sidelink communication in accordance with the set of spatial reuse parameters using a set of resources that at least partially overlaps with the set of reserved resources.

DETAILED DESCRIPTION

Figure 1:
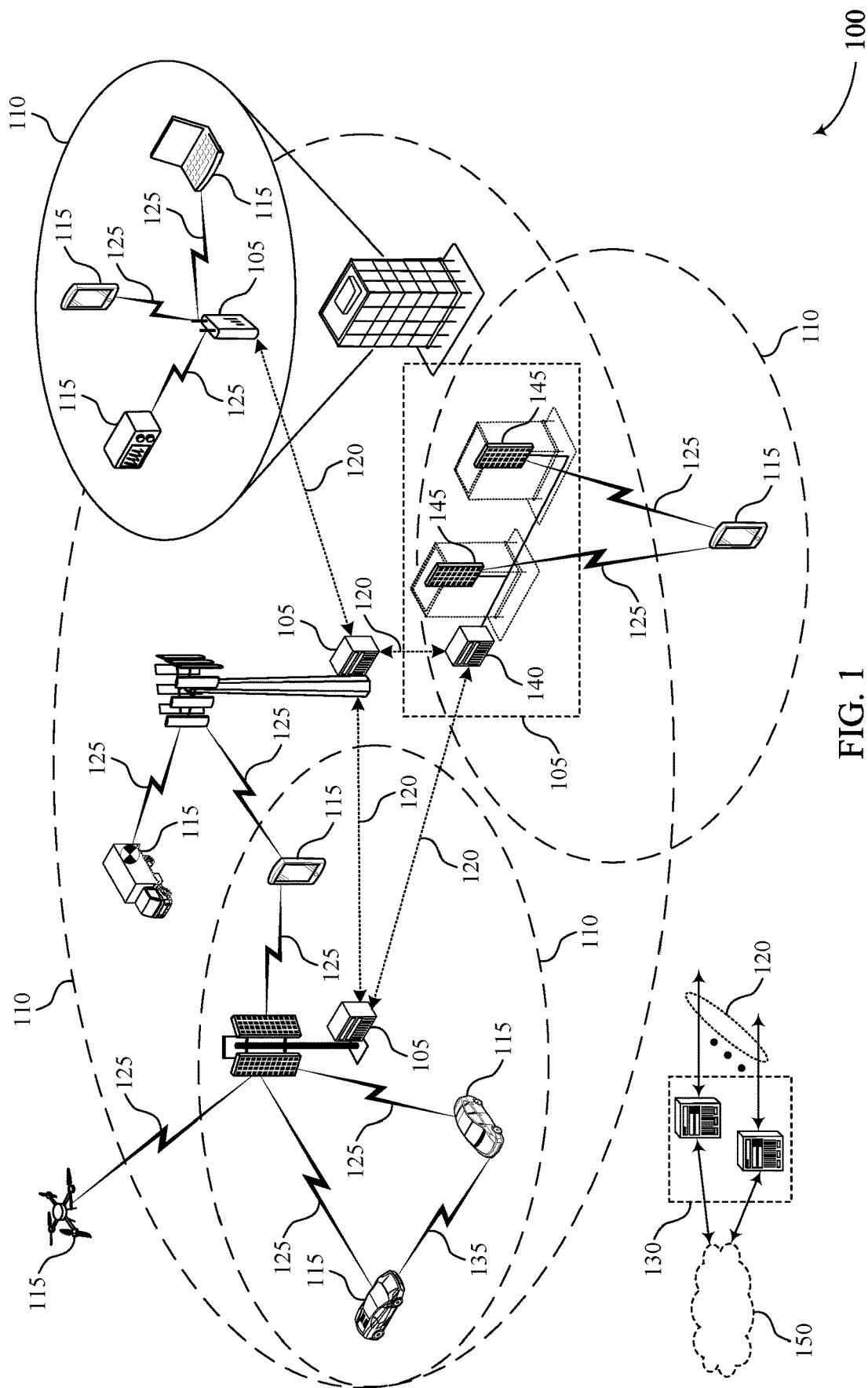
FIGS. 1 and 2 illustrate examples of wireless communications systems that support spatial reuse for sidelink communications in accordance with aspects of the present disclosure.

In some wireless communications systems, a transmitting device in the network (e.g., a user equipment (UE), base station, or some other node) may convey sidelink control information (SCI) to one or more receiving devices (e.g., another sidelink device). The transmitting device may transmit a first stage SCI (e.g., SCI-1) to each sidelink device in the network to indicate resources reserved for retransmissions by the transmitting device, subsequent transmissions by the transmitting device, or both. In some cases, the resources reserved for retransmissions may be under-utilized such that the device reserving the resources may not actually use the reserved resources despite indicating the reservation of the resources. To improve the resource utilization and the throughput of transmissions, some receiving devices may reuse the resources (e.g., spatial reuse may be introduced). However, the transmitting device be unaware of which devices are reusing the resources, and the reuse may result in interference at the transmitting device or at the receiving device to which sidelink messages are intended. Such spatial reuse techniques may result in reduced quality of communications by the transmitting device if the transmitting device is unaware of the spatial reuse.

To improve throughput for sidelink transmissions, and to reduce interference within the network, a transmitting UE may transmit one or more spatial reuse parameters to receiving UEs to manage the reuse of the sidelink resources. For example, the transmitting UE may transmit a spatial reuse allowance indicator, one or more spatial reuse power parameters, a group configuration, a zone configuration, or some combination thereof, to one or more receiving UEs to improve the reuse of sidelink resources. The spatial reuse parameters may be transmitted via a first stage SCI, a second stage SCI, a physical sidelink shared channel (PSSCH) (e.g., the spatial reuse parameters may be broadcast to one or more receiving UEs), or some combination thereof. The receiving UEs may reuse the resources indicated as reserved by the transmitting UE based on the received spatial reuse parameters, which may give the transmitting UE more control of the reuse of the reserved resources, leading to improved resource utilization and throughput for wireless communications.

The transmitting UE may enable or disable spatial reuse at a UE or a group of UEs by transmitting a spatial reuse allowance indicator to one or more UEs (e.g., one or more neighboring UEs in the vicinity of the transmitting UE and capable of receiving and decoding the spatial reuse allowance indicator). The spatial reuse allowance indicator (e.g., a parameter indicated by a number of bits, such as SR_allowed) may indicate whether spatial reuse is disabled, enabled for all UEs, enabled for a single UE, enabled for a group of UEs, or some combination thereof. In some examples, the transmitting UE may enable or disable spatial reuse based on a priority of the traffic transmitted by the transmitting UE. For example, if the UE is transmitting high priority data, the UE may disable spatial reuse (e.g., for all UEs) to reduce interference with the high priority data. Additionally or alternatively, the transmitting UE may allow a UE to reuse the resources if a priority of the data to be transmitted by the UE is higher than a priority of the data transmitted by the transmitting UE (e.g., the priority of the data traffic may be indicated via the first stage SCI). In some examples, the receiving UEs may perform channel sensing to determine a transmit power for reusing the resources. For example, a receiving UE may measure a reference signal received power (RSRP), and the UE may determine to reuse the resources if the RSRP measurement is below a configured threshold. In some examples, the RSRP threshold may be indicated via the spatial reuse allowance indication.

In one example, the spatial reuse parameters may include a spatial reuse power budget for reusing the resources. For example, a transmitting UE may enable spatial reuse by a receiving UE within the indicated transmit power budget. The transmitting UE may calculate a power that a receiving UE may use for spatial reuse that may limit the interference with other communications (e.g., other receiving UEs reusing resources, another SCI transmission, the current data transmitted by the transmitting UE, or the like). The transmitting UE may indicate the power budget to the receiving UE via a spatial reuse power parameter (e.g., a number of bits may be used to indicate that spatial reuse is allowed at the receiving UE within the power budget). In some examples, the power budget may be determined based on one or more of the transmit power of the transmitting UE, a level of interference that may be tolerated by the transmitting UE, or an interference margin.

In another example, the spatial reuse parameters may include one or more group-specific spatial reuse parameters. Different groups of UEs may receive different spatial reuse configurations. For example, the level of spatial reuse may be more aggressive for one group of UEs than for another group of UEs. Additionally or alternatively, the spatial reuse parameters may include a zone identifier (ID) of the transmitting UE, a zone ID of the receiving UE, a zone ID of another UE receiving transmissions from the transmitting UE, or some combination thereof. A receiving UE may determine whether to reuse resources based on the indicated zone IDs (e.g., based on a location of the UE). A transmitting UE may thereby configure group-specific spatial reuse parameters, zone-specific spatial reuse parameters, or both.

As described herein, a transmitting UE may transmit a spatial reuse allowance indicator that may include one or more additional spatial reuse parameters. By transmitting the spatial reuse parameters to manage the reuse of resources, the transmitting UE may reduce interference within the network and improve the quality of communications.

Aspects of the disclosure are initially described in the context of wireless communications systems. Additional aspects are described in the with reference to coverage area diagrams, group configuration diagrams, and zone configuration diagrams. Aspects of the disclosure are further illustrated by and described with reference to apparatus diagrams, system diagrams, and flowcharts that relate to spatial reuse for sidelink communications.

FIG. 1 illustrates an example of a wireless communications system 100 that supports spatial reuse for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may convey SCI to one or more receiving UEs 115 (e.g., sidelink UEs 115). The UE 115 may convey a first stage SCI, a second stage SCI, or both. The first stage SCI may indicate resources reserved for retransmissions by the UE 115. As described herein, the UE 115 may transmit a sidelink control message to one or more neighboring UEs 115 to manage the reuse of the reserved resources. For example, the sidelink control message may include an indication of the set of reserved resources, a reuse allowance indication, one or more spatial reuse parameters, or a combination thereof. The neighboring UEs 115 may monitor for the control message. The neighboring UEs 115 may determine whether to reuse the reserved resources based on the sidelink control message. For example, a neighboring UE 115 may determine whether the reserved resources are available for reuse based on the reuse allowance indicator, a priority of the sidelink communications to be performed by the neighboring UE 115, a priority associated with the sidelink communications by the transmitting UE 115, or some combination thereof. The neighboring UEs 115 may perform sidelink communications based on the sidelink control message, the reuse allowance indicator, the spatial reuse parameters, or a combination thereof. By transmitting the sidelink control message indicating the reserved resources, a transmitting UE 115 may improve throughput of sidelink communications and reduce interference within the network.

Figure 2:
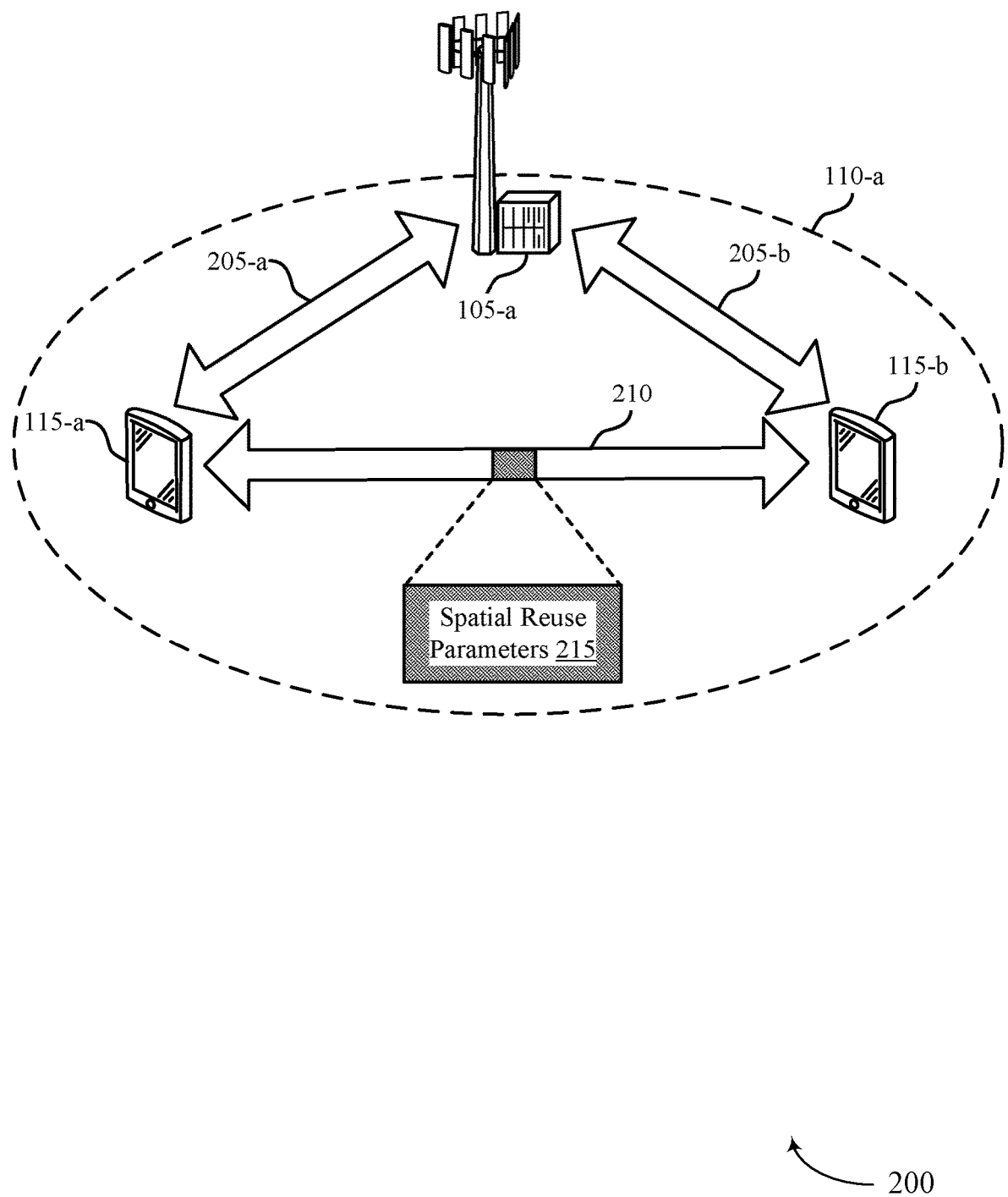

FIG. 2 illustrates an example of a wireless communications system 200 that supports spatial reuse for sidelink communications in accordance with aspects of the present disclosure. The wireless communications system 200 may include base station 105-a, a UE 115-a, and a UE 115-b, which may be examples of a base station 105 and a UE 115 as described with reference to FIG. 1. Base station 105-a may communicate with UEs 115-a and 115-b within a geographic coverage area 110-a and over communication links 205-a, and 205-b, respectively. UEs 115-a and 115-b may communicate over a sidelink communication link 210. UE 115-a may transmit SCI to UE 115-b, and the SCI may indicate resources reserved for retransmissions by UE 115-a. As described herein, UE 115-a may transmit the spatial reuse parameters 215 to UE 115-b to improve the spatial reuse of the sidelink resources, reduce interference, and improve the quality of the communications in the wireless communications system 200.

In some wireless communications systems 200, a device in the network (e.g., a UE 115, base station 105, or some other node) may convey SCI to another device (e.g., another sidelink device or V2X device). The SCI may be conveyed in one or more stages. For example, sidelink UE 115-a may transmit a first stage SCI (e.g., SCI-1) to UE 115-b via the sidelink communication link 210. The first stage SCI may indicate resources that are reserved by UE 115-a for retransmissions, subsequent transmissions, or both, and UE 115-*b* may decode the first stage SCI to determine where the reserved resources are located (e.g., to refrain from using resources that are reserved for another sidelink transmission and to reduce resource collision within the wireless communications system 200). In some cases, the first stage SCI may periodically reserve the resources (e.g., up to three reserved resources, or some other number of reserved resources, may be periodically reserved by the first stage SCI). In one example, (e.g., during Mode 2 sidelink operations), UE 115-*b* may perform channel sensing (e.g., blindly decoding a physical sidelink control channel (PSCCH)) to locate resources reserved for other sidelink transmissions, and the first stage SCI may reduce the need for sensing each channel. For example, the first stage SCI may include an explicit indication such that UE 115-*b* may refrain from blindly decoding the channels. The first stage SCI may be transmitted via sidelink control resources in a PSCCH. In some examples, the PSCCH may be configured to occupy a number of physical resource blocks (PRBs) within a single subchannel (e.g., 10, 12, 15, 20, 25, or some other number of PRBs within the subchannel), and a duration of the PSCCH may be configured (e.g., the PSCCH may span two, three, or some other number of symbols).

The first stage SCI may include one or more fields to indicate a location of the reserved resources. For example, the first stage SCI may include one or more fields to convey a frequency domain resource allocation (FDRA), a time domain resource allocation (TDRA), a resource reservation period (e.g., a period for repeating the SCI transmission and the corresponding reserved resources), a modulation and coding scheme (MCS) for a second stage SCI, a beta offset value for the second stage SCI, a demodulation reference signal (DMRS) port (e.g., one bit indicating a number of data layers), a physical sidelink feedback channel (PSFCH) overhead indicator, a priority, one or more additional reserved bits, or a combination thereof. In some examples, the FDRA may be a number of bits in the first stage SCI that may indicate a number of slots and a number of subchannels reserved for the reserved resources (e.g., UE 115-*b* may determine a location of the reserved resources based on the FDRA by using the subchannel including the PSCCH and the first stage SCI as a reference), and the TDRA may be a number of bits in the first stage SCI (e.g., 5 bits, 9 bits, or some other number of bits) that may indicate a number of time resources reserved. As such, the first stage SCI may indicate the reserved resources to the one or more sidelink UEs 115 in the network.

The sidelink UEs 115 may attempt to decode the reserved resources indicated by the first stage SCI. In one example, the reserved resources may be used for retransmission of sidelink data or the first stage SCI. Additionally or alternatively, the reserved resources may include resources for sidelink transmissions, such as a PSSCH. The PSSCH may be transmitted via one or more subchannels and may include a number of symbols. In some examples, the PSSCH may include the PSCCH (e.g., the PSCCH may be transmitted via one or more time or frequency resources within one or more full or partial symbols of the PSSCH). A second stage SCI may be transmitted via one or more symbols of the PSSCH (e.g., the SCI-2 may be front-loaded and transmitted via one or more of the beginning symbols of the PSSCH). The second stage SCI may include an indication of which of the reserved resources UE 115-*a* may use for sidelink transmissions. The second stage SCI may thereby be received and decoded by one or more UEs 115 intended to receive and decode the sidelink transmissions. In some examples, the second stage SCI may include one or more fields (e.g., bit fields) that may indicate one or more parameters for locating the resources that are to be used for decoding the PSSCH. For example, the second stage SCI may include a HARQ ID, a HARQ enable or disable bit, a new data indicator (NDI), a redundancy version (RV) ID, a source ID, a destination ID, or some combination thereof.

To reduce interference during the transmission of the second stage SCI, UE 115-*a* may transmit the first stage SCI with a larger coverage area than the PSSCH (e.g., the PSSCH including the second stage SCI). For example, UE 115-*a* may transmit first stage SCI to UE 115-*b*, and one or more other sidelink UEs 115 in the SCI coverage area, but UE 115-*a* may transmit the PSSCH and the corresponding second stage SCI within a smaller coverage area (e.g., the second stage SCI may be transmitted to intended receiving UEs 115). UE 115-*a* may reduce the size of the coverage area by reducing a transmit power used for transmitting the respective SCI. As such, the area of throughput for the sidelink transmissions may be limited by the radius of the coverage area of the first stage SCI. For example, UE 115-*a* may transmit first stage SCI using a higher transmit power as compared to the second stage SCI.

A UE 115 may decode a first stage SCI transmission from a transmitting UE 115, and the UE 115 may determine to reuse the reserved resources indicated by the first stage SCI to improve the throughput of the sidelink communications. For example, UE 115-*a* may transmit first stage SCI to UE 115-*b* and one or more other UEs 115 within the first stage SCI coverage area. In some cases, UE 115-*b* may not receive the second stage SCI from UE 115-*a*, or UE 115-*b* may refrain from decoding the second stage SCI from UE 115-*a* (e.g., UE 115-*b* may be out of the coverage area of the second stage SCI, UE 115-*a* may not intend for UE 115-*b* to receive the corresponding sidelink communications, UE 115-*b* may be unable to decode the resources indicated by the first stage SCI, or some combination thereof), and UE 115-*b* may instead determine to reuse the resources indicated by the first stage SCI. Additionally or alternatively, UE 115-*b* may determine to reuse the resources if UE 115-*b* determines that UE 115-*a* is a safe distance from UE 115-*b* (e.g., an interference-free distance). For example, UE 115-*b* may perform one or more distance measurements, pathloss measurements, RSRP measurements, or some combination thereof, to determine an interference-free or reduced interference coverage area for reusing the indicated reserved resources. However, the reuse of the resources by UE 115-*b* may, in some cases, interfere with the existing transmissions by UE 115-*a*, the reuse of the resources by another UE 115, or both.

As described herein, UE 115-*a* (e.g., a transmitting UE 115) may transmit the spatial reuse parameters 215 to UE 115-*b* and one or more other receiving UEs 115 to improve the reuse of the reserved resources and to reduce interference. By transmitting the spatial reuse parameters 215, UE 115-*a* may manage the reuse of the reserved resources. For example, UE 115-*a* may determine the spatial reuse parameters 215 based on a priority of the data to be transmitted by UE 115-*a*, a priority of the data to be transmitted by the receiving UEs 115, an MCS (e.g., as indicated via the SCI-1), a position of the receiving UEs 115 relative to UE 115-*a*, or the like. The spatial reuse parameters 215 may improve the reuse of the resources within the network by reducing interference and improving throughput of communications.

The spatial reuse parameters 215 may include a spatial reuse allowance indication. The spatial reuse allowance indication may enable or disable spatial reuse for a single UE 115, such as UE 115-b, for a group of UEs 115, for all of the UEs 115 in the network, or some combination thereof. The spatial reuse allowance indication (e.g., SR_allowed) may be transmitted via the first stage SCI (e.g., the allowance indication may be one bit, two bits, or some other number of bits within the SCI-1). Example values for the spatial reuse allowance indication are shown in Table 1. In one example, UE 115-a may determine to enable or disable spatial reuse based on a priority of the data traffic transmitted by UE 115-a. For example, if UE 115-a is transmitting high priority data, UE 115-a may disable spatial reuse to reduce interference. Additionally or alternatively, UE 115-a may enable spatial reuse for a single UE 115 or a group of UEs 115 if the priority of the data to be transmitted by the single UE 115 or the group of UEs 115 is higher than the priority of the data transmitted by UE 115-a. In one example, UE 115-a may transmit low priority data, or UE 115-a may protect the transmitted data, and UE 115-a may enable reuse of the resources by one or more receiving UEs 115. Additionally or alternatively, in some examples, UE 115-a may refrain from transmitting a spatial reuse allowance indication, and the spatial reuse of the resources may be determined based on a priority of the data traffic (e.g., a UE 115 transmitting higher priority traffic may reuse the resources of a UE 115 transmitting lower priority traffic).

mitted, or if spatial reuse is disabled (e.g., if the allowance indication has a value of zero), UE 115-b may measure an RSRP, a received signal strength indicator (RSSI), or both, associated with a channel for reusing the resources. UE 115-b may determine to reuse the resources if the RSRP measurement is below a default threshold (e.g., RSRPThres as shown in Table 1). If UE 115-a enables spatial reuse at UE 115-b, the channel sensing performed by UE 115-b may be adjusted. For example, UE 115-a may transmit an indication of a configured spatial reuse allowed RSRP threshold, as shown in Table 1 (e.g., RSRPThresSRAllowed, RSRPThresSRAllowed2, or RSRPThresSRAllowed3 for the different spatial reuse configurations), and UE 115-b may determine to reuse the resources if the RSRP measurement at UE 115-b is less than the spatial reuse allowed RSRP threshold. In some examples, the spatial reuse allowed RSRP threshold may be larger than the default RSRP threshold.

The spatial reuse allowed RSRP threshold may be determined based on a priority of the existing traffic, a priority of the traffic to be transmitted via the reused resources, or both. For example, the RSRP allowed threshold may be determined based on a priority of the traffic transmitted by UE 115-a and a priority of the traffic transmitted by UE 115-b (e.g., a traffic priority pair). In some examples, if spatial reuse is enabled for UE 115-b, UE 115-b (e.g., a physical

TABLE 1

Example Spatial Reuse Transmit Power Calculations

| Spatial Reuse Allowance Indication | Resource Selection Threshold | Transmit Power |
|---|---|---|
| 0 | RSRPThres | $\min(P_{CMAX}, P_{MAX, CBR}, P_{PSSCH, D}, P_{PSSCH, SL})$ |
| 1 | RSRPThresSRAllowed | $\min(\ldots, P_{SR, MAX} - P_{SR, BO} - I_{MRG})$ |
| 2 | RSRPThreshSRAllowed2 | $\min(\ldots, P_{SR2, MAX} - P_{SR, BO} - I_{MRG})$ |
| 3 | RSRPThreshSRAllowed3 | $\min(\ldots, P_{SR3, MAX} - P_{SR, BO} - I_{MRG})$ |
| . | . | . |
| . | . | . |
| . | . | . |

Table 1 illustrates example values for a spatial reuse allowance indication that may be included in the spatial reuse parameters 215. Although not depicted in Table 1, the spatial reuse allowance indication, SR_allowed, may be one bit, two bits, or some other number of bits (e.g., in some examples, the spatial reuse allowance indication may have values larger than three). The value of the spatial reuse allowance indication may indicate a configuration for spatial reuse. For example, a spatial reuse allowance indication value of one may indicate a first spatial reuse configuration, and a spatial reuse allowance value of two may indicate a second spatial reuse configuration. In some examples, if the spatial reuse allowance indication is zero, spatial reuse may not be allowed. As illustrated in Table 1, the spatial reuse allowance indication may indicate a resource selection threshold and one or more parameters for a receiving UE 115 to calculate a transmit power for reusing the resources. In some examples, the resource selection threshold and the one or more power parameters may be different for different values of the spatial reuse allowance indication (e.g., for different spatial reuse configurations).

A receiving UE 115, such as UE 115-b, may perform channel sensing to determine a transmit power for reusing the resources without interfering with existing transmissions. If a spatial reuse allowance indication is not translayer of UE 115-b) may determine a first set of available resources based on the default RSRP threshold, and UE 115-b may determine a second set of available resources based on the RSRP allowed threshold. An upper layer of UE 115-b (e.g., an application layer) may select the resources to reuse based on the first and second set of determined resources to avoid collisions among other receiving UEs 115 that may reuse the resources (e.g., the physical layer of UE 115-b may report the traffic priority pair to the application layer of UE 115-b).

Additionally or alternatively, UE 115-b may determine a transmit power for reusing the resources. As depicted in Table 1, UE 115-b may determine the transmit power based on a function of one or more power parameters and one or more interference parameters. For example, if spatial reuse is not allowed (e.g., if the spatial reuse allowance indication is zero), UE 115-b may determine the transmit power for reusing resources based on the parameters included in the function shown in the first row of Table 1 (e.g., based on a capability of UE 115-b, $P_{CMAX}$, signal strength measurements at UE 115-b, $P_{MAX,CBR}$, a pathloss between UE 115-a and UE 115-b, $P_{PSSCH,SL}$, and a pathloss of a downlink connection, $P_{PSSCH,D}$). If spatial reuse is allowed at UE 115-b or a group of UEs 115 including UE 115-b, UE 115-a may configure an interference margin (e.g., $I_{MRG}$, $I_{MRG2}$, or $I_{MRG3}$ as shown in Table 1) for UE 115-*b* or the group of UEs 115. UE 115-*b* may determine a back-off transmit power (e.g., $P_{SR,BO}$) for reusing the resources based on the RSRP and RSSI measurements performed by UE 115-*b* (e.g., $P_{SR,BO}$=RSRPmeasurement−RSRPThresh, where RSRPmeasurement may be the measured signal power associated with the SCI). UE 115-*b* may thereby determine a transmit power for reusing the resources based on the functions depicted for spatial reuse allowed values of one, two, or three of Table 1. In some examples, the spatial reuse transmit power (e.g., $P_{SR,MAX}$, $P_{SR,MAX2}$, or $P_{SR,MAX3}$ as shown in Table 1), may be determined based on one or more capabilities of UE 115-*b* (e.g., the spatial reuse transmit power may be pre-configured value for UE 115-*b* and one or more other receiving UEs 115). The functions for determining a transmit power may be based on a difference between the spatial reuse transmit power, the back-off power determined by UE 115-*b*, and the interference margin for the respective spatial reuse allowed configuration.

In some examples, the application layer of UE 115-*b* may determine a transmit power based on a first transmit power calculation assuming spatial reuse is disabled and a second transmit power calculation assuming spatial reuse is enabled. For example, if the physical layer reports a traffic priority pair to the application layer, the application layer may determine resources for reuse and transmit power levels for reusing the resources. UE 115-*b* may thereby determine a transmit power level for reusing the resources based on the spatial reuse allowance indication and one or more measurements by UE 115-*b* to reduce interference when reusing the resources.

In some examples, UE 115-*a* may additionally or alternatively indicate a power budget for reusing the resources via the spatial reuse parameters 215. The power budget may be indicated via the spatial reuse transmit power parameter as described with reference to Table 1 (e.g., $P_{SR,MAX}$). The power budget may be transmitted via the first stage SCI to UE 115-*b* and one or more other receiving UEs 115 (e.g., the power budget may be some number of bits, such as SR_PowerAllowed). For example, if UE 115-*a* enables spatial reuse at UE 115-*b*, UE 115-*a* may configure the spatial reuse transmit power parameter for UE 115-*b* such that UE 115-*b* may reuse the resources with a transmit power that may not interfere with the data traffic transmitted by UE 115-*a* or some other UE 115. UE 115-*a* may configure the spatial reuse transmit power based on the data traffic communicated by UE 115-*a* (e.g., in addition to or instead of determining the transmit power based on capabilities of UE 115-*b*). UE 115-*a* may thereby transmit a spatial reuse allowance indication that disables spatial reuse, enables spatial reuse with a transmit power budget, or enables spatial reuse without a transmit power budget. That is, the different values of the spatial reuse allowance indication may configure a UE 115 or a group of UEs 115 with a different spatial reuse configuration and a different power budget.

UE 115-*a* may determine the transmit power budget configurations based on a coverage difference between the first stage SCI and the PSSCH including the second stage SCI. In one example, UE 115-*a* may assume that UE 115-*b* is located at the boundary of the first stage SCI coverage area, and UE 115-*a* may determine a spatial reuse transmit power for UE 115-*b* based on the distance between the boundary of the first stage SCI coverage area and the boundary of the PSSCH coverage area. Additionally or alternatively, UE 115-*a* may determine the transmit power for UE 115-*b* based on an MCS of the traffic, a priority of the traffic, a tolerable interference level, and a margin (e.g., SR Tranmit P=(P_PSSCH−PminSCI1)+Int−MRG, where P_PSSCH may be the signal strength for decoding the PSSCH, and PminSCI1 may be the signal strength for decoding the first stage SCI).

UE 115-*b* may determine a transmit power for reusing the resources based on the indicated transmit power budget, the functions shown in Table 1, a sensing procedure by UE 115-*b*, one or more distance measurements by UE 115-*b*, or some combination thereof. For example, UE 115-*a* may transmit the spatial reuse parameters 215 including a spatial reuse allowance indication and a spatial reuse power configuration to UE 115-*b*, and UE 115-*b* may perform one or more channel measurements, distance measurements, or both (e.g., UE 115-*b* may measure a distance to UE 115-*a*, a distance to other UEs 115, an RSRP value, or the like) to determine another transmit power (e.g., UE 115-*b* may determine a second transmit power assuming spatial reuse is disabled). In one example, UE 115-*b* may determine a transmit power that may be lower than the transmit power indicated by the spatial reuse parameters 215, and UE 115-*b* may reuse the resources with the lower transmit power determined based on the measurements performed at UE 115-*b*. UE 115-*b* and UE 115-*a* may adjust the transmit power accordingly to reduce interference and improve the quality of communications (e.g., UE 115-*a* and UE 115-*b* may determine the spatial reuse transmit power based on an open-loop power control).

UE 115-*a* may transmit the spatial reuse parameters 215 via first stage SCI, second stage SCI, a PSSCH, or some combination thereof. In a first example, UE 115-*a* may transmit the spatial reuse parameters 215 via one or more bits of the first stage SCI (e.g., one or more bits configured for SR_allowed, SR_PowerAllowed, or both, as described above). In some cases, the spatial reuse parameters may be transmitted via the first stage SCI using CRC scrambling (e.g., the spatial reuse allowance indication, the spatial reuse power budget, or both may be encrypted in the first stage SCI CRC, and a receiving UE 115 may recover the spatial reuse parameters 215 by decoding the first stage SCI CRC). By transmitting the spatial reuse parameters 215 via the first stage SCI, a UE 115 may receive the spatial reuse parameters 215 even if the UE 115 refrains from decoding the second stage SCI or a PSSCH transmission from UE 115-*a*. However, in some examples, the spatial reuse parameters 215 may include the spatial reuse allowance indication, the spatial reuse power budget, a group configuration for reusing the resources, a zone ID of the transmitting UE 115, a zone ID of a receiving UE 115, or some combination thereof for improving the spatial reuse of resources, and the first stage SCI may not include enough bits to transmit the spatial reuse parameters 215.

In such examples, the second stage SCI transmitted by UE 115-*a* may be configured with more fields for transmitting the spatial reuse parameters 215 than the first stage SCI, and the spatial reuse parameters (e.g., a spatial reuse power, maxSRPower, a group-based spatial reuse configuration, SRG, zone ID information, ZoneID, or some combination thereof) may be transmitted via the second stage SCI. In some examples, a second stage SCI format for spatial reuse may be configured (e.g., the configured spatial reuse SCI-2 format may be rate-matched to a single sub-channel that may contain the SCI-1). The coverage area of the configured second stage SCI may be larger than the coverage area of the PSSCH, such that the second stage SCI may be transmitted via a coverage area that is the same size as the coverage area for the first stage SCI (e.g., the receiving UEs 115 may receive the first stage SCI and the second stage SCI including the spatial reuse parameters 215).

In another example, the spatial reuse parameters 215 may be transmitted via a PSSCH (e.g., the spatial reuse parameters 215 may be broadcast to UEs 115). The spatial reuse parameters 215 may be transmitted via a spatial reuse information element (IE), and the spatial reuse parameters 215 may be transmitted periodically or aperiodically via the PSSCH. In some examples, the spatial reuse parameters 215 may be transmitted via a combination of the first stage SCI, the second stage SCI and the PSSCH. For example, some parameters may be transmitted via the first stage SCI, some parameters may be transmitted via the second stage SCI, and a remainder of the parameters may be transmitted via the PSSCH.

UE 115-a may thereby transmit the spatial reuse parameters 215 including some or all of the information depicted in Table 1 to UE 115-b, and UE 115-b may determine to reuse the resources reserved for retransmissions by UE 115-a based on the spatial reuse parameters 215, a channel sensing procedure performed at UE 115-b, or both. By transmitting the spatial reuse parameters 215, UE 115-a may reduce interference and improve the quality of communications.

Figure 3:
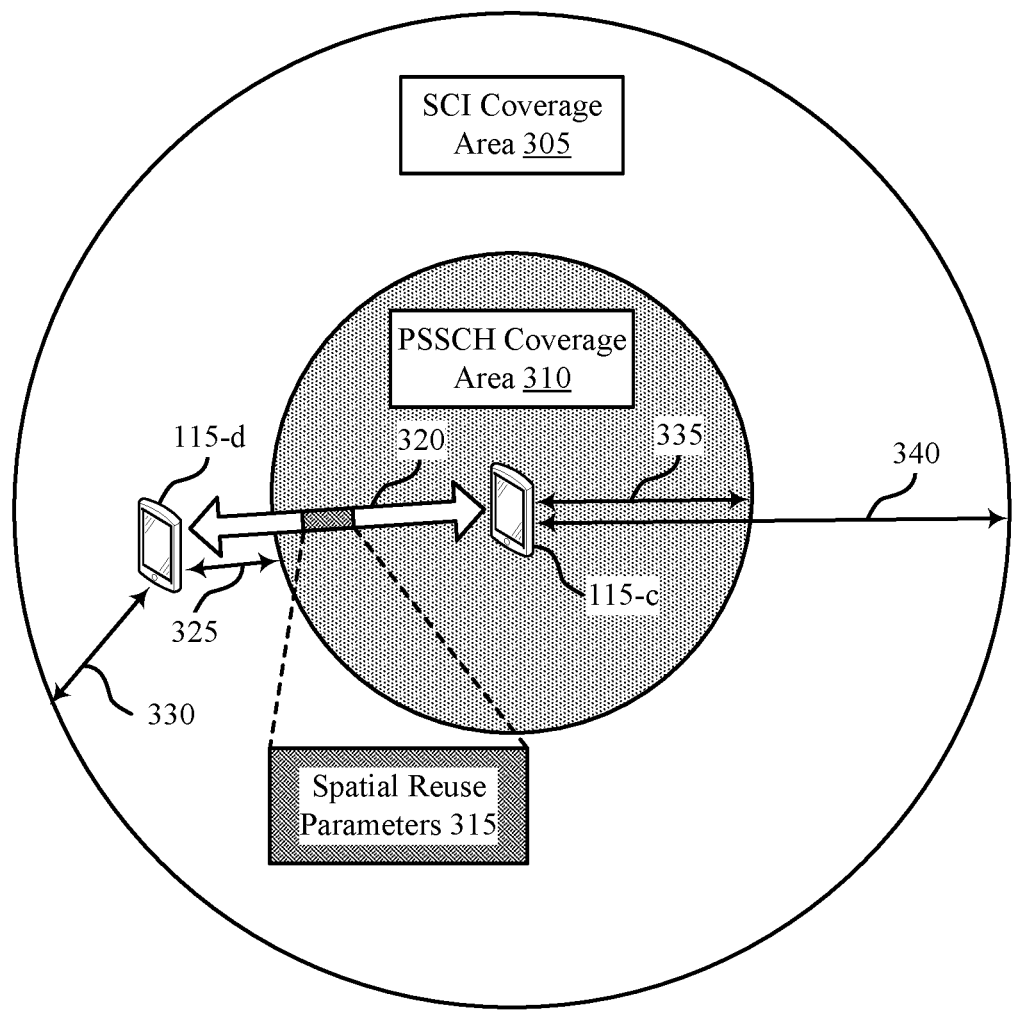
FIG. 3 illustrates an example of a coverage area diagram that supports spatial reuse for sidelink communications in accordance with aspects of the present disclosure.

FIG. 3 illustrates an example of a coverage area diagram 300 that supports spatial reuse for sidelink communications in accordance with aspects of the present disclosure. The coverage area diagram 300 may include UEs 115-c and 115-d, which may be examples of UEs 115 as described with reference to FIGS. 1 and 2. The coverage area diagram 300 may include the SCI coverage area 305 and the PSSCH coverage area 310. The SCI coverage area 305 may illustrate the coverage area of a first stage SCI transmission, and the PSSCH coverage area 310 may illustrate the coverage area of a PSSCH transmission, which may include second stage SCI (e.g., the second stage SCI may be transmitted via a control channel within the PSSCH). In the example of FIG. 3, UE 115-c may transmit the first stage SCI and the PSSCH to UE 115-d via the sidelink communication link 320, and UE 115-d may determine to reuse one or more resources indicated by the first stage SCI. As described herein, UE 115-c may transmit the spatial reuse parameters 315 via the sidelink communication link 320 to UE 115-d to manage the reuse of the resources reserved by the first stage SCI.

In some examples, the coverage area of the first stage SCI may be configured by the network. For example, the network may configure UE 115-c to transmit first stage SCI within the SCI coverage area 305 (e.g., UE 115-c may be configured to transmit first stage SCI with a configured transmit power, via configured transmit resources, or both, within the SCI coverage area 305). The UEs 115 located within the SCI coverage area 305 may receive the first stage SCI including an indication of reserved resources for sidelink communications associated with UE 115-c. The resources may be reserved for retransmissions by UE 115-c. For example, if a receiving UE 115 fails to receive or decode a transmission from UE 115-c, UE 115-c may retransmit the data using the reserved resources. In some cases, the reserved resources may be under-utilized (e.g., UE 115-c may refrain from using the resources for retransmissions if the receiving UEs 115 receive and decode the data from UE 115-c). The reserved resources (e.g., PSSCH resources) may include second stage SCI. The second stage SCI may indicate the location of the reserved resources to the receiving UEs 115 that may receive the sidelink data from UE 115-c via the reserved resources.

In some examples, the PSSCH coverage area 310 and corresponding second stage SCI transmissions may be limited by the SCI radius 340 of the SCI coverage area 305. For example, the first stage SCI may be transmitted to the UEs 115 in the SCI coverage area 305, and the sidelink data and second stage SCI conveyed via the PSSCH coverage area 310 may be transmitted to a group of UEs 115 that may be intended to receive sidelink communications from UE 115-c (e.g., a group of UEs 115 receiving sidelink data via the resources indicated by the first stage SCI). The PSSCH coverage area 310 may be smaller than the SCI coverage area 305 accordingly. Additionally or alternatively, the PSSCH coverage area 310 may be smaller than the SCI coverage area 305 to reduce interference during the transmission of the second stage SCI.

In some examples, a coverage area parameter may be configured for determining the PSSCH radius 335 (e.g., the coverage area parameter may be determined based on a path loss exponent, a signal to interference plus noise ratio (SINR) target, or the like). For example, the PSSCH radius 335 may be smaller than the SCI radius 340 by a factor of the coverage area parameter. For example, the PSSCH radius 335 may be referred to as $R_2$, the SCI radius 340 may be referred to as $R_1$, the coverage area parameter may be referred to as $\alpha$, and $\alpha$ may be determined such that $R_1 \geq \alpha R_2$. In one example (e.g., during free space omni-direction transmission), if the coverage area parameter is two, the PSSCH radius 335 may be two times smaller than the SCI radius 340.

The throughput of communications and the spatial reuse of resources may be improved if a UE 115 determines to reuse the resources indicated by the first stage SCI. For example, UE 115-d may be within the SCI coverage area 305, but outside of the PSSCH coverage area 310 (e.g., UE 115-d may be unable to receive or decode the second stage SCI). UE 115-d may improve the area of throughput for sidelink transmissions by determining an interference-free or a reduced interference distance for reusing the resources indicated by the first stage SCI.

In some examples, UE 115-d may determine one or more distances for reusing the resources. In a first example, UE 115-d may determine to reuse the resources within the interference-free distance 325 (e.g., "d2"). UE 115-d may determine the interference-free distance 325 through one or more channel measurement procedures. In a second example, UE 115-d may determine to reuse the resources within a new coverage area with a radius of the distance 330 (e.g., "d1"). The distance 330 may be determined based on an estimate of interference between a control channel associated with UE 115-d and a control channel associated with UE 115-c. Additionally or alternatively, UE 115-d may determine to reuse the resources based on the shortest distance of the distances 330 and 325 (e.g., the smallest radius for the reuse coverage area to reduce interference with other transmissions). In some cases, however, UE 115-c may be unaware of the spatial reuse of resources by UE 115-d, and the reuse of the resources reserved for UE 115-c may result in interference with existing communications.

As described herein, UE 115-c may transmit the spatial reuse parameters 315 to UE 115-d to manage the reuse of the resources. The spatial reuse parameters 315 may be an example of the spatial reuse parameters 215 as described with reference to FIG. 2. In some examples, UE 115-c may transmit the spatial reuse parameters 315 to UE 115-d via the first stage SCI on the sidelink communication link 320. Additionally or alternatively, UE 115-c may transmit the spatial reuse parameters 315 to one or more other UEs 115 via the first stage SCI, the second stage SCI, or the PSSCH. In one example, UE 115-c may broadcast the spatial reuse parameters 315 to a group of UEs 115. The spatial reuse parameters 315 may include a spatial reuse allowance indication, a spatial reuse transmit power budget, a spatial reuse group configuration, a zone ID of UE 115-c, a zone ID of one or more receiving UEs 115, or some combination thereof.

UE 115-d and other receiving UEs 115 that may be located within the SCI coverage area 305, but outside of the PSSCH coverage area 310 may receive the spatial reuse parameters 315. UE 115-d and one or more of the other receiving UEs 115 may determine to reuse the resources indicated by the first stage SCI based on the spatial reuse parameters 315, one or more channel measurements performed by the UEs 115, or both. By determining resources to reuse and a transmit power for reusing the resources based on the spatial reuse parameters 315 and one or more channel measurements at UE 115-d, UE 115-d may refrain from interfering with other communications while reusing the resources.

In one example, UE 115-c may transmit high priority data traffic, and UE 115-c may disable spatial reuse by UE 115-d to reduce interference that may be experienced by the receiving UEs 115 receiving the high priority data traffic. Additionally or alternatively, UE 115-c may refrain from using the reserved resources, UE 115-c may transmit low-priority data traffic, or UE 115-c may determine that UE 115-d may be a safe distance from UE 115-c, and UE 115-c may enable spatial reuse at UE 115-d. In some examples, UE 115-c may configure a spatial reuse power budget for UE 115-d, and UE 115-d may reuse the resources within the spatial reuse power budget. UE 115-d may thereby improve the quality and the throughput of communications for UE 115-c, UE 115-d, and the one or more other receiving UEs 115 in the network by reusing the resources based on the spatial reuse parameters 315.

Figure 4:
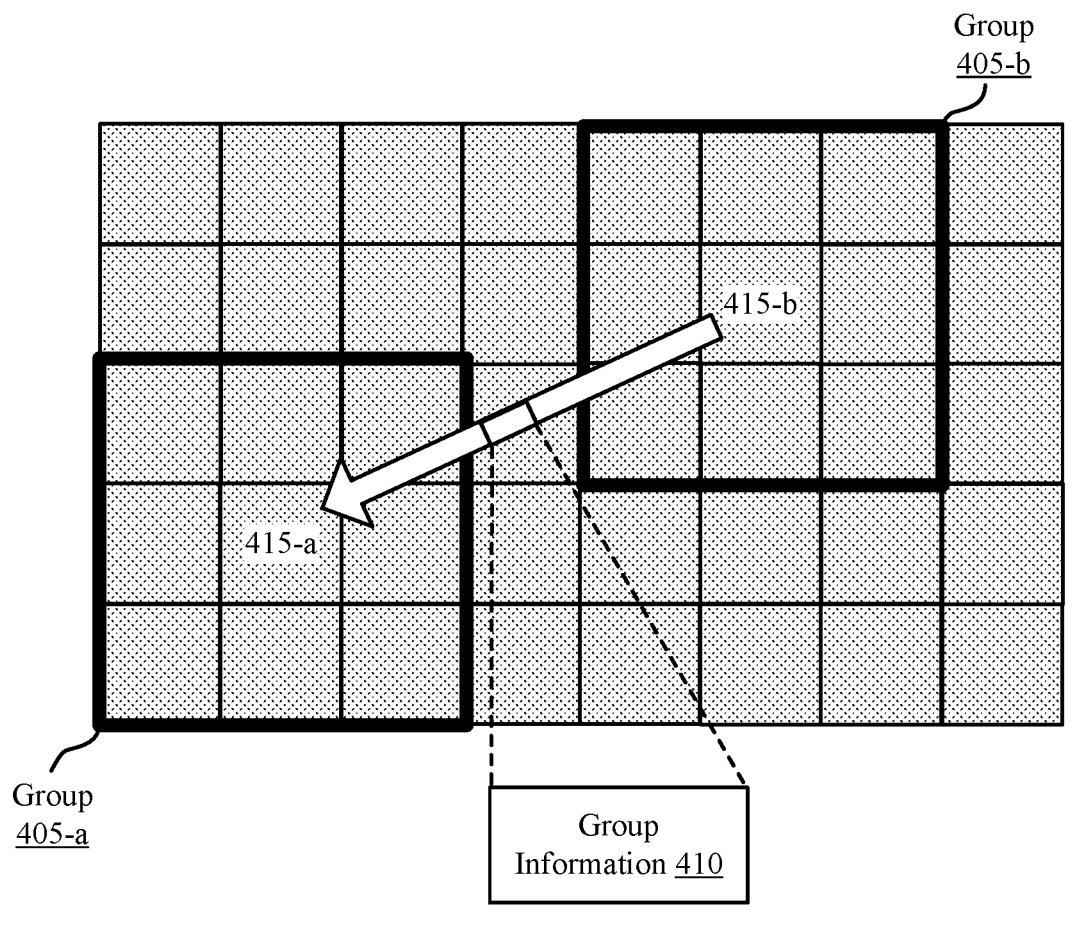
FIG. 4 illustrates an example of a group configuration diagram that supports spatial reuse for sidelink communications in accordance with aspects of the present disclosure.

FIG. 4 illustrates an example of a group configuration diagram 400 that supports spatial reuse for sidelink communications in accordance with aspects of the present disclosure. The group configuration diagram 400 may include devices 415-a and 415-b, which may be examples of sidelink UEs 115 as described with reference to FIGS. 1 through 3. Transmitting device 415-b may transmit the group information 410 to receiving device 415-a. The group information 410 may be an example of a spatial reuse parameter as described with reference to FIGS. 2 and 3. In some examples, transmitting device 415-b may configure one or more group-based spatial reuse configurations to improve the reuse of sidelink resources.

In some examples of the group configuration diagram 400, group 405-a may include device 415-a and one or more other devices 415, and group 405-b may include device 415-b and one or more other devices 415. The groups 405 may be configured by the network, and the group configurations may be associated with a timer. For example, group 405-a may be configured to include device 415-a and one or more other devices 415 at a first time, and group 405-a may be invalid after a configured time period (e.g., if group 405-a is not updated within the time period). As such, the groups 405 may be updated to account for changes in capabilities of the devices 415, locations of the devices 415, or the like.

A device 415 may be a group lead for a group 405, and the group lead device 415 may manage the group 405. For example, the group lead (e.g., a road side unit (RSU), a base station 105, a device 415 at a fixed location, or some other device 415) may add or remove devices 415 from the group 405. In some examples, the devices 415 may transmit a group request message requesting to be added to a group 405. The group lead device 415 may determine to add the device 415 to the group 405, and the group lead device 415 may transmit a group addition indication to the respective device 415. In some examples, another device 415 in the group 405 (e.g., a transmitting device 415) may receive a group request message, and the device 415 may forward the message to the group lead device 415. The devices 415 may maintain a group list, which may include other devices 415 in the group 405, and the device 415 that may be the group lead.

In some examples, the network, an upper layer (e.g., application layers, such as a V2X application layer) of the devices 415, or both, may configure the groups 405 based on an interference tolerance of the devices 415. For example, if enhanced inter-cell interference coordination (eICIC), coordinated multipoint (CoMP), or both are supported by a device 415, the device 415 may tolerate a higher level of interference than if the eICIC and CoMP are not supported by the device 415, and the devices 415 that support eICIC, CoMP, or both may be configured in a group 405. Additionally or alternatively, the groups 405 may be configured based on a zone ID of the devices 415. For example, in some communications systems (e.g., V2X systems) the devices 415 may be associated with zone IDs. A transmitting device 415 may transmit an indication of the zone ID of the transmitting device 415 via second stage SCI, and one or more receiving devices 415 may determine a group based on the zone IDs of the transmitting device 415 and the zone IDs of the receiving devices 415 (e.g., based on a location of the devices 415).

As described herein, a transmitting device may configure group-based spatial reuse parameters. For example, the devices 415 of group 405-a may be configured with a first group-based spatial reuse configuration and the devices 415 of group 405-b may be configured with a second group-based spatial reuse configuration. In some examples, a spatial reuse configuration for one group 405 may be more aggressive than a spatial reuse configuration for a different group 405. For example, the capabilities of the devices 415 of group 405-a may allow for more interference tolerance than the capabilities of the devices 415 of group 405-b. Group 405-a may be configured with more aggressive spatial reuse parameters than group 405-b accordingly.

In one example, one or more devices 415 may be connected via wired connections (e.g., the devices 415 may be access points (APs), RSUs, or some other node deployed in a fixed location, and the devices 415 may be connected via wires or fibers from the fronthaul or the backhaul). The connections between the devices 415 may tolerate more interference than wireless connections (e.g., connections between UEs 115), and the group of devices 415 may be configured with more aggressive spatial reuse parameters accordingly. For example, the devices 415 may be configured with group-based spatial reuse parameters that may be decoded to indicate a spatial reuse transmit power, an interference margin, a spatial reuse RSRP threshold, or the like, that may allow for more aggressive spatial reuse if the devices 415 of the group 405 tolerate more interference, and may allow for less aggressive spatial reuse if the devices 415 of the group 405 tolerate less interference.

In the example of FIG. 4, device 415-b may transmit first stage SCI to device 415-a indicating a set of resources reserved for retransmissions by device 415-b. Device 415-a may determine whether to reuse the set of reserved resources. Device 415-b may manage the reuse of the resources by transmitting one or more spatial reuse parameters to device 415-*a*, which may be examples of the spatial reuse parameters 215 as described with reference to FIG. 2. Additionally or alternatively, device 415-*b* may transmit the group information 410 to device 415-*a*. The group information 410 may be an example of a spatial reuse parameter, and the group information 410 may improve the spatial reuse of resources by device 415-*a*. For example, the group information 410 may indicate information about group 405-*a* to device 415-*a*. Additionally or alternatively, the group information 410 may include a group-based spatial reuse configuration for device 415-*a* and one or more other devices 415 in group 405-*a*. Device 415-*a* (e.g., a spatial reuse device 415) may determine to reuse the resources based on the group-based configuration for the devices 415 of group 405-*a*.

In another example, device 415-*a* may decode a second stage SCI from device 415-*b*, and device 415-*a* may determine which group 405 device 415-*b* is in based on decoding the second stage SCI. Device 415-*a* may transmit a group request message to device 415-*b* or to the group lead of group 405-*b*. In some examples, device 415-*b* may forward the group request message to the group lead. The group request message may include a request to join group 405-*b*. Additionally or alternatively, the group request message may include a request to join some other group 405. For example, device 415-*a* may determine to reuse the resources associated with device 415-*b* for communicating with a receiving device 415. Device 415-*a* may request to join the group 405 in which the receiving device 415 may be located such that device 415-*a* may be configured with the group-based spatial reuse configuration associated with the respective group 405. Device 415-*b*, the group lead, or both, may determine to add device 415-*a* to the group 405 based on the group request message and may transmit an indication to device 415-*a* to allow device 415-*a* to join the group 405.

A transmitting device 415 may thereby configure spatial reuse for a group of devices 415 to improve spatial reuse within the group 405. The group-specific spatial reuse configurations may improve throughput and reduce interference associated with the communications by the transmitting device 415 and the devices 415 within the group 405.

Figure 5:
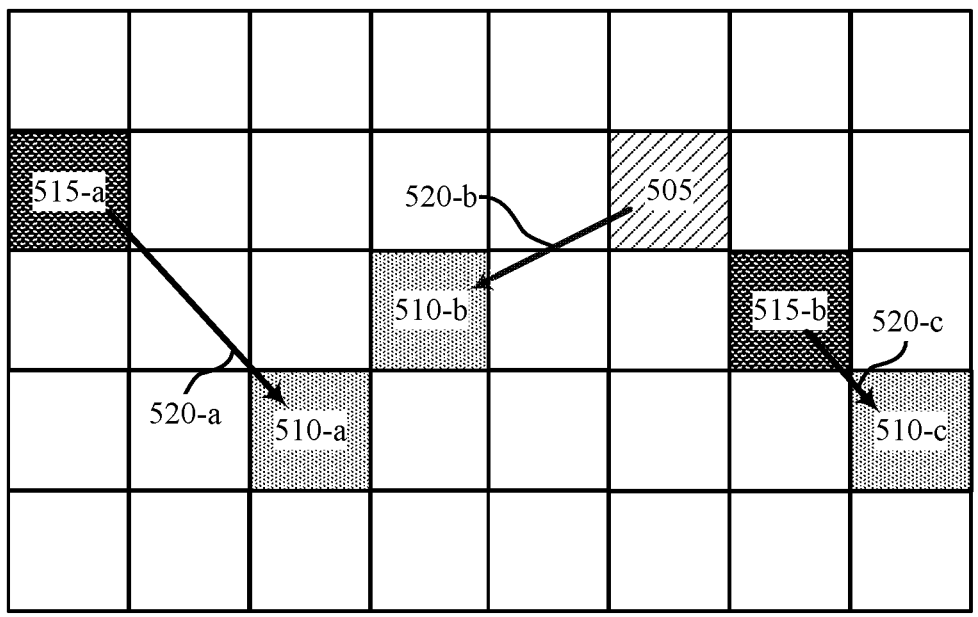
FIG. 5 illustrates an example of a zone configuration diagram that supports spatial reuse for sidelink communications in accordance with aspects of the present disclosure.

FIG. 5 illustrates an example of a zone configuration diagram 500 that supports spatial reuse for sidelink communications in accordance with aspects of the present disclosure. The zone configuration diagram 500 may include a transmitting device 505, receiving devices 510 (e.g., receiving devices 510-*a*, 510-*b*, and 510-*c*), and spatial reuse devices 515 (e.g., spatial reuse devices 515-*a* and 515-*b*), which may each represent examples of a UE 115 as described with reference to FIGS. 2 and 3. Although not shown in the example of FIG. 5, the devices may be in different zones, and each zone may include one or more other devices. For example, receiving device 510-*b* may be in a different zone that the transmitting device 505. In the example of the zone configuration diagram 500, the transmitting device 505 may transmit a zone ID of the transmitting device 505, the zone ID of one or more other devices in the network, or both, to spatial reuse devices 515-*a* and 515-*b* and receiving devices 510-*a* and 510-*b*. The transmitting device 505 may transmit the zone IDs to support zone-based spatial reuse and to improve the reuse of sidelink resources.

Spatial reuse devices 515-*a* and 515-*b* may receive first stage SCI from the transmitting device 505, and spatial reuse devices 515-*a* and 515-*b* may determine whether to reuse the resources indicated by the first stage SCI to communicate with receiving devices 510-*a* and 510-*c*, respectively. For example, the transmitting device 505 may communicate with receiving device 510-*b* via the sidelink communication link 520-*b* (e.g., and/or one or more other receiving devices 510). In one example, if receiving device 510-*b* is unable to receive or decode the data transmissions, the transmitting device 505 may retransmit the data traffic using a set of reserved resources. The transmitting device 505 may indicate the reserved resources to the devices in the network via the first stage SCI. If the transmitting device 505 determines to reuse the resources, the transmitting device 505 may transmit a second stage SCI to receiving device 510-*b* and the one or more other receiving devices 510 that may have been unable to receive or decode the original data transmission. In the example of FIG. 5, spatial reuse devices 515-*a* and 515-*b* may receive the first stage SCI from the transmitting device 505, and the spatial reuse devices 515 may determine whether to reuse the resources indicated by the first stage SCI.

To improve the spatial reuse of resources, the transmitting device 505 may transmit one or more spatial reuse parameters to the spatial reuse devices 515, the receiving devices 510, or both, as described with reference to FIG. 2. In some cases, the spatial reuse parameters may include a zone ID of one or more of the devices in the network. The spatial reuse devices 515 may determine whether to reuse the resources to communicate with the receiving devices 510 based on the one or more zone IDs (e.g., based on a location of the devices determined from the zone IDs). For example, spatial reuse device 515-*a* may determine whether to reuse the resources for transmitting sidelink data to receiving device 510-*a* via sidelink communication link 520-*a*, and spatial reuse device 515-*b* may determine whether to reuse the resources for transmitting sidelink data to receiving device 510-*c* via sidelink communication link 520-*c*. The spatial reuse devices 515 may determine a transmit power for reusing the resources while refraining from interfering with existing transmissions.

In one example, the transmitting device 505 may transmit the zone ID of the transmitting device 505 via the spatial reuse parameters. The zone ID may be transmitted via first stage SCI or second stage SCI to spatial reuse device 515-*a*, spatial reuse device 515-*b*, or both. The spatial reuse devices 515 may determine a distance to the transmitting device 505 (e.g., distTX) based on the zone ID of the transmitting device, an RSRP measurement performed by the spatial reuse devices 515, or both. Additionally or alternatively, the spatial reuse devices 515 may determine a distance between the transmitting device 505 and receiving device 510-*b* (e.g., distTXRX) based on an MCS of the PSSCH transmitted by the transmitting device 505 (e.g., the spatial reuse devices 515 may determine the MCS by decoding the first stage SCI from the transmitting device 505). Spatial reuse devices 515-*a* and 515-*b* may thereby estimate a distance to receiving device 510-*b* based on the distance between the spatial reuse device 515 and the transmitting device 505 and the distance between the transmitting device 505 and receiving device 510-*b* (e.g., distRX=distTX−distTXRX). In some examples, the spatial reuse devices 515 may improve the accuracy of the distance estimation by determining the distance based on a beta offset value indicated via the second stage SCI, an RSRP measurement, or both.

In another example, the transmitting device 505 may transmit the zone ID of receiving device 510-*b* (e.g., and one or more other receiving devices 510 that may receive data traffic from the transmitting device 505) to the spatial reuse device 515. For example, if the transmitting device 505 enables spatial reuse at spatial reuse device 515-*b*, the transmitting device may transmit the zone ID of receiving device 510-*b* to spatial reuse device 515-*b*. Spatial reuse device 515-*b* may estimate the distance between spatial reuse device 515-*b* and receiving device 510-*b* based on the zone ID of receiving device 510-*b* (e.g., and the zone ID of spatial reuse device 515-*b*). The estimated location of receiving device 510-*b* may be more accurate if spatial reuse device 515-*b* receives the zone ID of receiving device 510-*b* than if spatial reuse device 515-*b* receives the zone ID of the transmitting device 505. The zone ID of receiving device 510-*b* may be transmitted via the first stage SCI, the second stage SCI, or the PSSCH (e.g., for groupcast spatial reuse).

In a third example, the transmitting device 505 may transmit the zone ID of receiving device 510-*b* and the zone ID of the transmitting device 505. The spatial reuse devices 515 may estimate the location of receiving device 510-*b* based on both the zone ID of the transmitting device and the zone ID of receiving device 510-*b*.

The spatial reuse devices 515 may determine whether to reuse the resources based on the estimated location of the transmitting device 505, receiving device 510-*b*, receiving devices 510-*a* and 510-*c*, the location of the spatial reuse devices 515, or some combination thereof. For example, spatial reuse device 515-*a* may perform an RSRP measurement for determining whether to reuse the resources, as described with reference to FIG. 2 and Table 1 (e.g., to determine a distance to the transmitting device 505, to determine if the RSRP measurement is less than a configured RSRP threshold for spatial reuse, to determine a safe transmit power, or some combination thereof). Spatial reuse device 515-*a* may determine that the transmitting device 505 is a safe distance from spatial reuse device 515-*a*, and spatial reuse device 515-*a* may determine a transmit power for reusing the resources based on the RSRP measurement and the spatial reuse parameters (e.g., as described with reference to Table 1). However, in the example of FIG. 5, spatial reuse device 515-*a* may determine the location of receiving device 510-*b* based on a zone ID indication received via the spatial reuse parameters. Spatial reuse device 515-*a* may determine that receiving device 510-*b* is close to receiving device 510-*a* (e.g., transmissions to receiving device 510-*a* from spatial reuse device 515-*a* may interfere with transmissions to receiving device 510-*b* from the transmitting device 505). Spatial reuse device 515-*a* may determine to reuse the resources with caution (e.g., with a reduced transmit power), or to refrain from reusing the resources based on the zone ID indications received from the transmitting device 505.

In another example, spatial reuse device 515-*b* may measure RSRP associated with the transmitting device 505, and spatial reuse device 515-*b* may determine that the RSRP measurement may exceed the configured RSRP threshold for spatial reuse (e.g., the transmitting device 505 may be close to spatial reuse device 515-*b*, and reuse of the resources may result in interference). However, spatial reuse device 515-*b* may determine that receiving device 510-*b* receiving transmissions from the transmitting device 505 is a safe distance (e.g., an interference-free distance) from spatial reuse device 515-*b* and from receiving device 510-*c*. Spatial reuse device 515-*b* may thereby determine to reuse the resources to transmit data to receiving device 510-*c* based on the location of receiving device 510-*b*.

The transmitting device 505 may adjust the transmit power for spatial reuse (e.g., if the transmit power determined by one or more of the spatial reuse devices 515 based on the zone ID indications results in interference) by transmitting the spatial reuse transmit power budget to the spatial reuse devices 515 as described with reference to FIG. 2. For example, receiving device 510-*b* may transmit feedback messages to the transmitting device 505 in response to receiving the sidelink data from the transmitting device 505. If the transmitting device 505 receives a number of negative acknowledgment (NACK) indications from receiving device 510-*b*, the transmitting device 505 may lower the spatial reuse transmit power budget for spatial reuse device 515-*a*, spatial reuse device 515-*b*, or both to reduce the interference (e.g., the NACK indications may indicate that receiving device 510-*b* may experience interference while receiving the communications from the transmitting device 505). The spatial reuse transmit power may be dynamically adjusted by the transmitting device 505 and the spatial reuse devices 515 to reduce interference and improve the quality of communications.

As described herein, a transmitting device 505 may transmit zone ID information to one or more devices that may reuse sidelink resources reserved for retransmissions by the transmitting device 505. The devices may determine a location of one or more devices receiving transmissions from the transmitting device based on the zone ID information, and the devices may determine whether to reuse the resources based on the location of the receiving devices 510, the location of the transmitting device 505, or a combination thereof. As such, the devices may refrain from interfering with existing transmissions and improve the quality of communications in the network.

Figure 6:
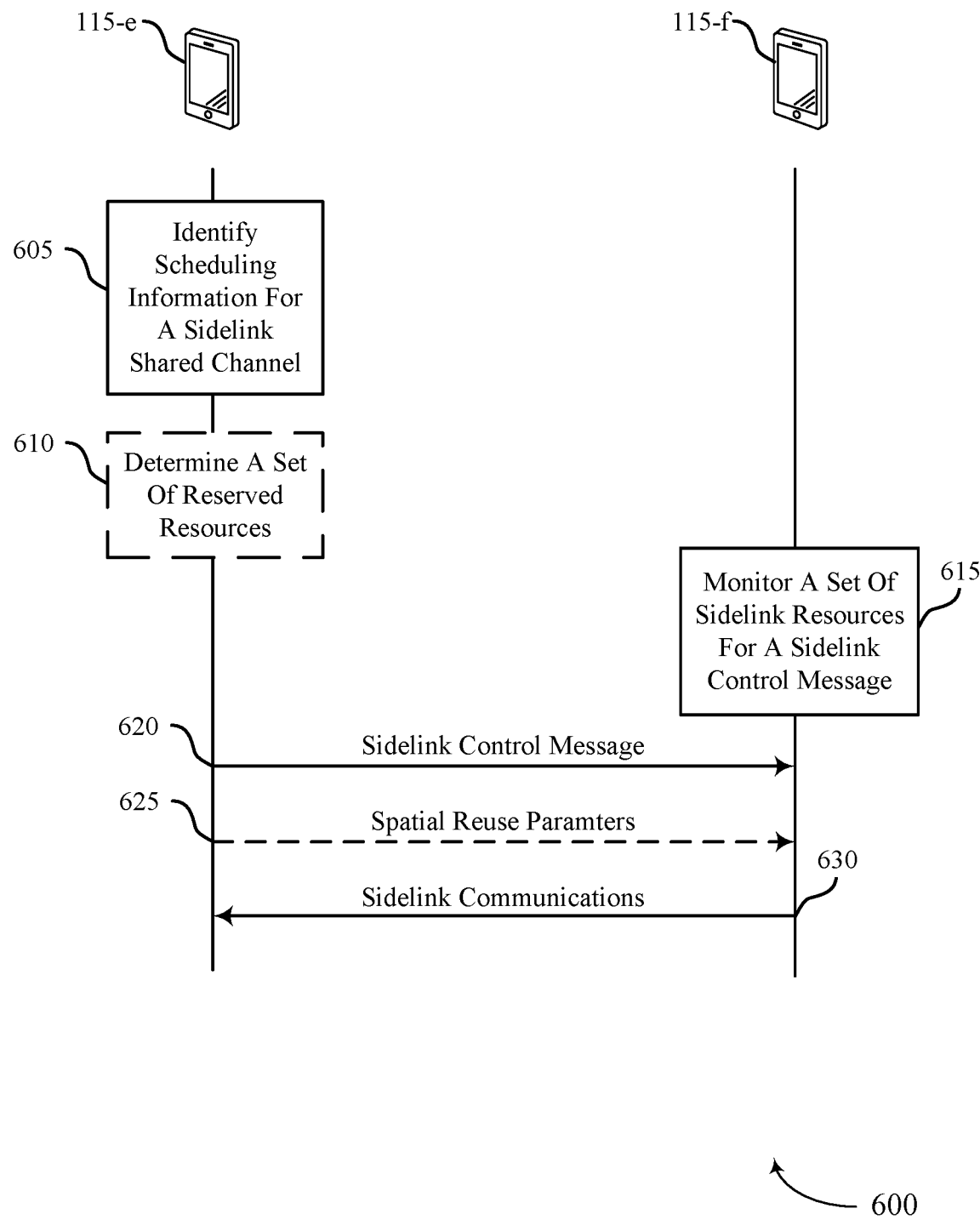
FIG. 6 illustrates an example of a process flow that supports spatial reuse for sidelink communications in accordance with aspects of the present disclosure.

FIG. 6 illustrates an example of a process flow 600 that supports spatial reuse for sidelink communications in accordance with one or more aspects of the present disclosure. In some examples, the process flow 600 may implement various aspects of the present disclosure described with reference to FIGS. 1 through 5. The process flow 600 may include UE 115-*e* and UE 115-*f*, which may be examples of UEs 115 as described with reference to FIG. 1. In some examples, UE 115-*e* may transmit a sidelink control message including a spatial reuse allowance indicator, which may allow UE 115-*f* to reuse a set of reserved resources to improve throughput of sidelink communications. It is understood that the devices and nodes described by the process flow 600 may communicate with or be coupled with other devices or nodes that are not illustrated. For instance, UE 115-*e* and UE 115-*f* may communicate with one or more other UEs 115, base stations 105, or other devices. Alternative examples of the following may be implemented, where some steps are performed in a different order than described or are not performed at all. In some cases, a step may include additional features not mentioned below, or further steps may be added.

At 605, UE 115-*e* may identify scheduling information for a sidelink shared channel (e.g., a PSSCH) between UE 115-*e* and a second UE 115 (e.g., UE 115-*f* or some other receiving UE 115).

At 610, in some examples, UE 115-*e* may determine a set of reserved resources for subsequent sidelink communications for UE 115-*e*. The set of reserved resources may be reserved for retransmissions by UE 115-*e*. For example, UE 115-*e* may determine a set of resources reserved for sidelink data transmissions, sidelink data retransmission, or both, between UE 115-*e* and one or more other UEs 115.

At 615, UE 115-*f* may monitor a set of sidelink resources for a sidelink control message from UE 115-*e* or another transmitting UE 115. For example, UE 115-*f* may determine to transmit sidelink data to another UE 115, and UE 115-*f* may monitor for the sidelink control message to indicate resources available for transmission of the sidelink data.

At 620, UE 115-e may transmit a sidelink control message indicating the scheduling information and the set of reserved resources for subsequent sidelink communications for UE 1115-e to UE 115-f. The sidelink control message may include a reuse allowance indicator. The reuse allowance indicator may indicate whether the set of reserved resources is available for spatial reuse by UE 115-f or one or more other UEs 115. The sidelink control message may be a first stage SCI, a second stage SCI, or both.

At 625, in some cases, UE 115-e may transmit spatial reuse parameters to UE 115-f In some examples, the spatial reuse parameters may be transmitted via the sidelink control message (e.g., the spatial reuse parameters may be included in the reuse allowance indicator). Additionally or alternatively, one or more of the spatial reuse parameters may be transmitted via a second sidelink control message, or via a spatial reuse information element in a sidelink shared channel. The spatial reuse parameters may include a zone ID of UE 115-e, zone IDs of one or more other UEs 115, a transmit power for spatial reuse, a transmit power offset, group information for one or more groups of UEs 115, or any combination thereof.

At 630, UE 115-f may perform a sidelink communication with UE 115-e based on the reuse allowance indicator. In one example, UE 115-f may determine that the set of reserved resources is available, and UE 115-f may perform the sidelink communication using the set of reserved resources accordingly. Additionally or alternatively, UE 115-f may determine that the set of reserved resources is unavailable, and UE 115-f may perform the sidelink communication using a different set of resources. UE 115-f may determine whether the set of reserved resources is available based on the reuse allowance indicator, a priority of the sidelink communication, a priority of the sidelink shared channel, or some combination thereof. For example, if the sidelink communication to be performed by UE 115-f is associated with a higher priority than the priority of the sidelink shared channel, UE 115-f may determine that the reserved resources are available for reuse. If the sidelink communication to be performed by UE 115-f is associated with a lower priority than the priority of the sidelink shared channel, UE 115-f may determine that the reserved resources are not available for reuse.

Figure 7:
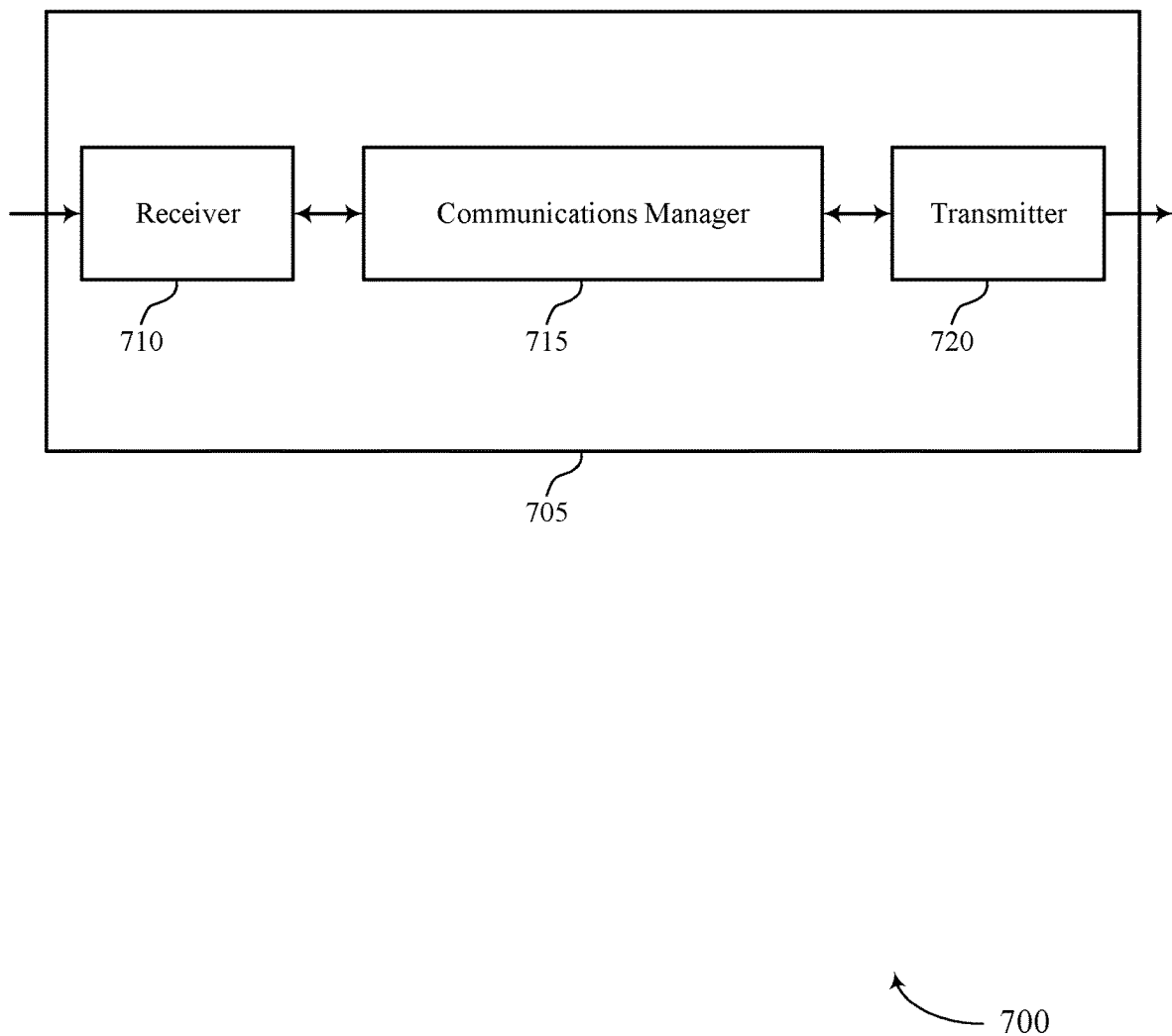
FIGS. 7 and 8 show block diagrams of devices that support spatial reuse for sidelink communications in accordance with aspects of the present disclosure.

FIG. 7 shows a block diagram 700 of a device 705 that supports spatial reuse for sidelink communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to spatial reuse for sidelink communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify scheduling information for a sidelink shared channel between the first UE and a second UE and transmit a sidelink control message indicating the scheduling information and a set of reserved resources for subsequent sidelink communications for the first UE, where the sidelink control message includes a reuse allowance indicator that indicates whether the set of reserved resources is available for spatial reuse by one or more UEs. The communications manager 715 may also monitor a set of sidelink resources for a sidelink control message from a first UE, receive the sidelink control message from the first UE based on the monitoring, where the sidelink control message includes a set of reserved resources for a sidelink shared channel between the first UE and a second UE, and a reuse allowance indicator that indicates whether the set of reserved resources is available for spatial reuse by the third UE, and perform a sidelink communication based on the reuse allowance indicator. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

The communications manager 715 as described herein may be implemented to realize one or more potential advantages. One implementation may provide for reduced interference for reusing sidelink resources. For example, the device 705 (e.g., a spatial reuse device 705) may reuse the sidelink resources based on one or more spatial reuse parameters configured by a transmitting device. The spatial reuse parameters may allow for the device 705 to determine resources to reuse, determine a transmit power for reusing the resources, or both, to refrain from interfering with existing communications. Another implementation may provide for improved throughput for sidelink communications. By reusing the sidelink resources based on the spatial reuse parameters, the device 705 may transmit more sidelink data using fewer resources and with reduced interference than if the device 705 refrained from reusing the sidelink resources, or if the device 705 reused the sidelink resources without the spatial reuse parameters (e.g., which may lead to increased interference and retransmissions).

By reusing the sidelink resources, a processor of a UE 115 (e.g., a processor controlling the receiver 710, the communications manager 715, the transmitter 720, etc.) may reduce processing resources used for communications. For example, by reusing the resources indicated by the first stage SCI, the processor may refrain from searching for resources to use for communications. Additionally or alternatively, by determining a transmit power for reusing the resources based on the spatial reuse parameters, the device 705 may reduce the processing power required to transmit sidelink data. For example, the spatial reuse parameters may indicate a lower transmit power may be used, and the device 705 may refrain from transmitting the sidelink data at a higher transmit power.

Figure 8:
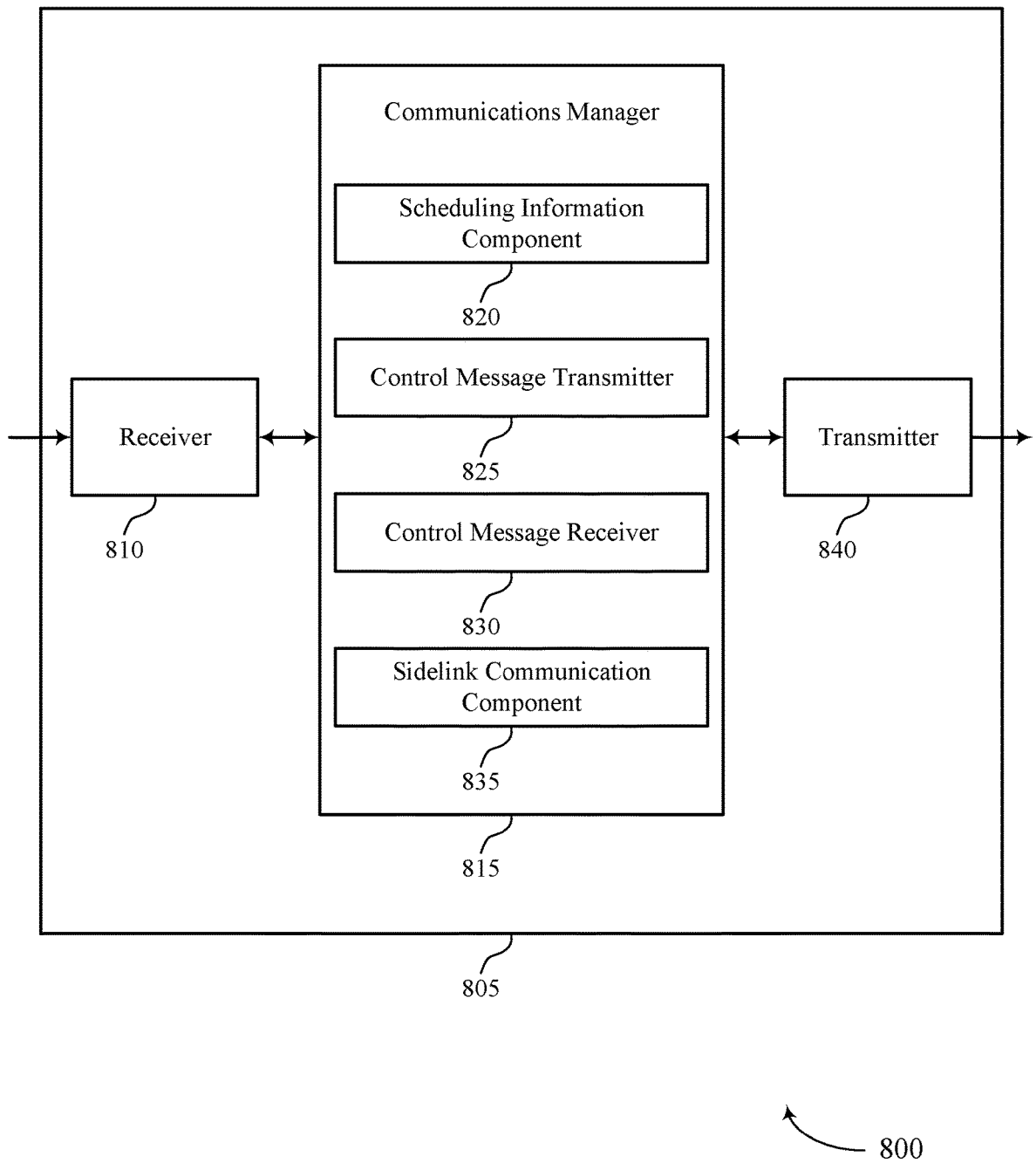

FIG. 8 shows a block diagram 800 of a device 805 that supports spatial reuse for sidelink communications in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to spatial reuse for sidelink communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a scheduling information component 820, a control message transmitter 825, a control message receiver 830, and a sidelink communication component 835. The communications manager 815 may be an example of aspects of the communications manager 1010 described herein.

The scheduling information component 820 may identify scheduling information for a sidelink shared channel between the first UE and a second UE.

The control message transmitter 825 may transmit a sidelink control message indicating the scheduling information and the set of reserved resources for subsequent sidelink communications for the first UE, where the sidelink control message includes a reuse allowance indicator that indicates whether the set of reserved resources is available for spatial reuse by one or more UEs.

The control message receiver 830 may monitor a set of sidelink resources for a sidelink control message from a first UE and receive the sidelink control message from the first UE based on the monitoring, where the sidelink control message includes a set of reserved resources for a sidelink shared channel between the first UE and a second UE, and a reuse allowance indicator that indicates whether the set of reserved resources is available for spatial reuse by the third UE.

The sidelink communication component 835 may perform a sidelink communication based on the reuse allowance indicator.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
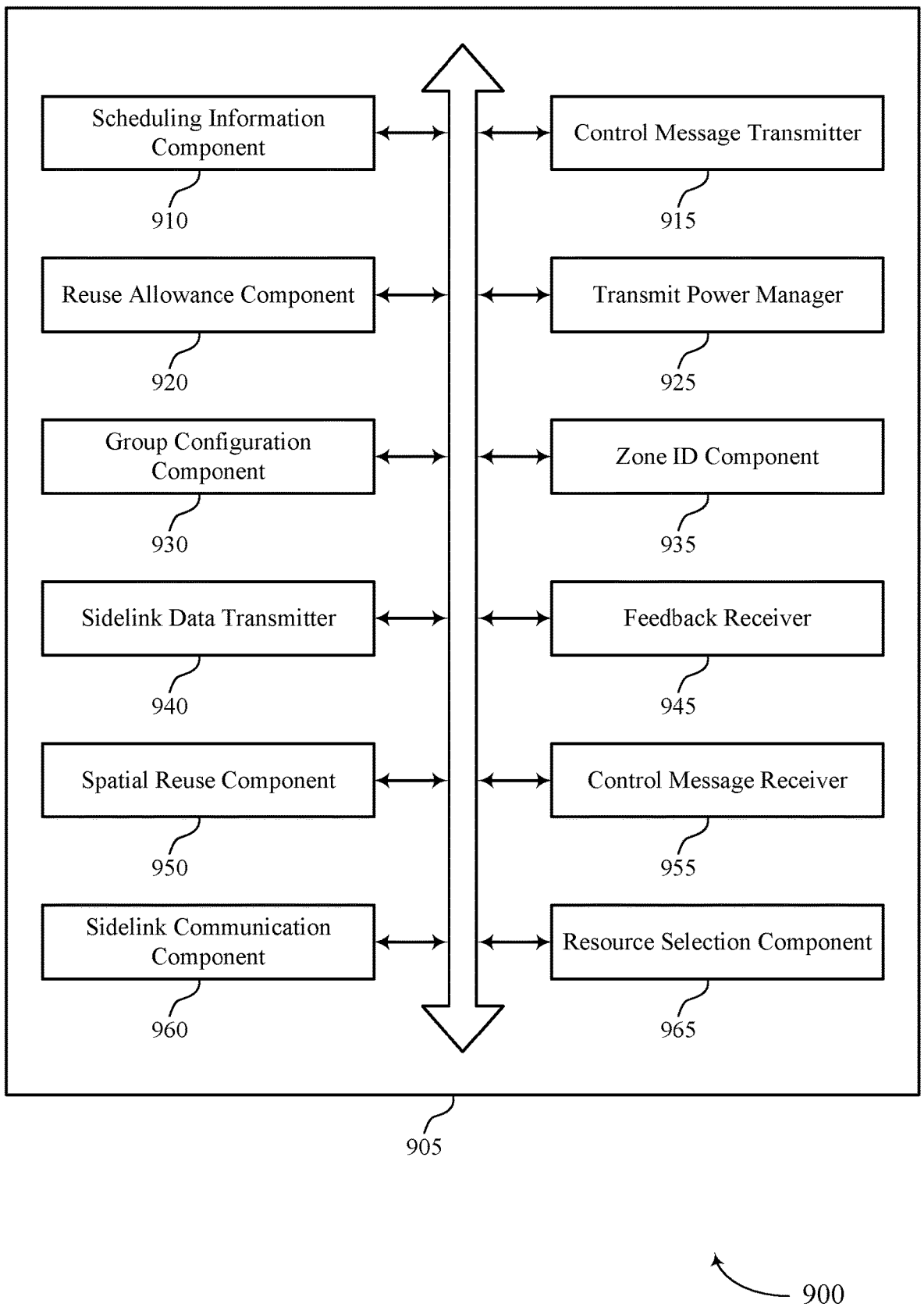
FIG. 9 shows a block diagram of a communications manager that supports spatial reuse for sidelink communications in accordance with aspects of the present disclosure.

FIG. 9 shows a block diagram 900 of a communications manager 905 that supports spatial reuse for sidelink communications in accordance with aspects of the present disclosure. The communications manager 905 may be an example of aspects of a communications manager 715, a communications manager 815, or a communications manager 1010 described herein. The communications manager 905 may include a scheduling information component 910, a control message transmitter 915 a reuse allowance component 920, a transmit power manager 925, a group configuration component 930, a zone ID component 935, a sidelink data transmitter 940, a feedback receiver 945, a spatial reuse component 950, a control message receiver 955, a sidelink communication component 960, and a resource selection component 965. Each of these modules may communicate, directly or indirectly, with one another (e.g., via one or more buses).

The scheduling information component 910 may identify scheduling information for a sidelink shared channel between the first UE and a second UE.

The control message transmitter 915 may transmit a sidelink control message indicating the scheduling information and a set of reserved resources for subsequent sidelink communications for the first UE, where the sidelink control message includes a reuse allowance indicator that indicates whether the set of reserved resources is available for spatial reuse by one or more UEs.

The control message receiver 955 may monitor a set of sidelink resources for a sidelink control message from a first UE. The control message receiver 955 may receive the sidelink control message from the first UE based on the monitoring, where the sidelink control message includes a set of reserved resources for a sidelink shared channel between the first UE and a second UE, and a reuse allowance indicator that indicates whether the set of reserved resources is available for spatial reuse by the third UE.

The sidelink communication component 960 may perform a sidelink communication based on the reuse allowance indicator.

The reuse allowance component 920 may determine the reuse allowance indicator based on a priority of the sidelink shared channel, an MCS of the scheduling information, a position of the one or more UEs, or any combination thereof.

The sidelink communication component 960 may refrain from performing a communication via the set of reserved resources based on determining that the set of reserved resources are unavailable for spatial reuse, the determining based on the reuse allowance indicator, where the sidelink communication is performed using a set of resources different from the set of reserved resources.

In some examples, the resource selection component 965 may determine that the set of reserved resources is unavailable based on the sidelink communication having a lower priority than the sidelink shared channel. In some examples, the resource selection component 965 may determine that the set of reserved resources is unavailable based on the third UE being in a different group than the first UE or the second UE. In some examples, the resource selection component 970 may determine that the set of reserved resources is unavailable based on a zone ID of the third UE, a zone ID of the first UE, a zone ID of the second UE, or a combination thereof, where the zone ID of the first UE or the zone ID of the second UE is included in the sidelink control message.

Additionally or alternatively, in some examples, the resource selection component 965 may perform the sidelink communication using the set of reserved resources based on determining that the set of reserved resources is available for spatial reuse, where the determining is based on the reuse allowance indicator and the sidelink communication having a higher priority than the sidelink shared channel.

In some examples, the reuse allowance indicator indicates a first set of transmit power parameters for reuse of the set of reserved resources according to a first receive power threshold and a second set of transmit power parameters for reuse of the set of reserved resources according to a second receive power threshold, and a set of transmit power parameters for the sidelink communication may be based on the reuse allowance indicator and one or more measurements of the third UE. In some examples, the set of transmit power parameters may be determined based on a coverage difference between the sidelink control message and the sidelink shared channel.

In some examples, the reuse allowance indictor may indicate a first set of transmit power parameters for reuse of the set of reserved resources according to a first receive power threshold and a second set of transmit power parameters for reuse of the set of reserved resources according to a second receive power threshold, and each of the first and second sets of transmit power parameters may include an allowed interference parameter and a margin parameter.

In some examples, the resource selection component 965 may select a set of resources for performing the sidelink communication based on a set of receive power thresholds for spatial reuse, where the set of resources at least partially overlaps the set of reserved resources, each of the set of receive power thresholds corresponds to a respective set of transmit power parameters, and the sidelink communication is performed based on the respective sets of transmit power parameters.

The group configuration component 930 may identify one or more groups of UEs, where each of the one or more groups of UEs is configured a respective set of spatial reuse rules for reusing the set of reserved resources. In some cases, the reuse allowance indicator includes different sets of spatial reuse parameters for each of the one or more groups of UEs.

In some examples, the group configuration component 930 may identify a group of the first UE based on the sidelink control message or a second sidelink control message from the first UE. In some examples, the resource selection component 965 may select a set of resources for performing the sidelink communication based on the group of the first UE. In some cases, the set of resources at least partially overlaps the set of reserved resources based on the third UE being in a same group as the first UE.

In some examples, the group configuration component 930 may transmit, to the first UE, a request to join the group of the first UE. In some examples, the group configuration component 930 may receive, from the first UE or a group leader of the group of the first UE, a response indicating the third UE to join the group of the first UE.

The zone ID component 935 may transmit an indication of a zone ID for a zone of the first UE based on a location of the first UE, where the indication of the zone ID is included in the sidelink control message or a second sidelink control message, and where the reuse allowance indicator is based on the zone of the first UE.

In some examples, the zone ID component 935 may transmit an indication of a zone ID for a zone of the second UE based on a location of the second UE, where the indication of the zone ID is included in the sidelink control message or a second sidelink control message, and where the reuse allowance indicator is based on the zone of the second UE.

In some examples, the zone ID component 935 may identify a zone ID associated with the first UE or the second UE based on the sidelink control message or a second sidelink control message from the first UE. In some examples, the resource selection component 965 may select a set of resources for performing the sidelink communication based on a zone of the third UE and the zone ID associated with the first UE or the second UE, the zone of the third UE based on a location of the third UE.

In some examples, the transmit power manager 925 may estimate a distance between the third UE and the first UE based on the sidelink control message. In some examples, the sidelink communication component 960 may perform the sidelink communication in accordance with a set of transmit power parameters, the set of transmit power parameters based on the distance.

The sidelink data transmitter 940 may transmit the sidelink shared channel to the second UE in accordance with the scheduling information. The feedback receiver 945 may receive a feedback message from the second UE for the sidelink shared channel. The spatial reuse component 950 may update a set of spatial reuse parameters for reusing the set of reserved resources based on the feedback message from the second UE.

In some cases, the reuse allowance indicator includes a set of bits indicating whether the set of reserved resources are available for spatial reuse by one or more UEs. In some cases, the set of bits indicates a set of transmit power parameters for the set of reserved resources available for spatial reuse.

In some examples, the spatial reuse component 950 may transmit a set of spatial reuse parameters in a second sidelink control message after transmitting the sidelink control message, the set of spatial reuse parameters including a zone ID of the first UE or the second UE, a maximum transmit power for spatial reuse, a transmit power offset, group information for one or more groups of UEs for reusing the set of reserved resources. In some cases, the second sidelink control message may be associated with a format specific to sidelink spatial reuse. In some cases, the set of spatial reuse parameters are indicated by a spatial reuse IE in the sidelink shared channel.

In some examples, the spatial reuse component 950 may transmit a set of spatial reuse parameters in the sidelink shared channel, the set of spatial reuse parameters including a zone ID of the first UE or the second UE, a maximum transmit power for spatial reuse, group information for one or more groups of UEs for reusing the set of reserved resources. In some cases, the set of spatial reuse parameters are indicated by a spatial reuse IE in the sidelink shared channel.

In some examples, the spatial reuse component 950 may receive a set of spatial reuse parameters in a second sidelink control message after receiving the sidelink control message, the set of spatial reuse parameters including a zone ID of the first UE or the second UE, a maximum transmit power for spatial reuse, a transmit power offset, group information for one or more groups of UEs for reusing the set of reserved resources.

In some examples, the spatial reuse component 950 may receive a set of spatial reuse parameters in the sidelink shared channel, the set of spatial reuse parameters including a zone ID of the first UE or the second UE, a maximum transmit power for spatial reuse, group information for one or more groups of UEs for reusing the set of reserved resources.

In some examples, the sidelink communication component 960 may perform the sidelink communication in accordance with the set of spatial reuse parameters using a set of resources that at least partially overlaps with the set of reserved resources.

Figure 10:
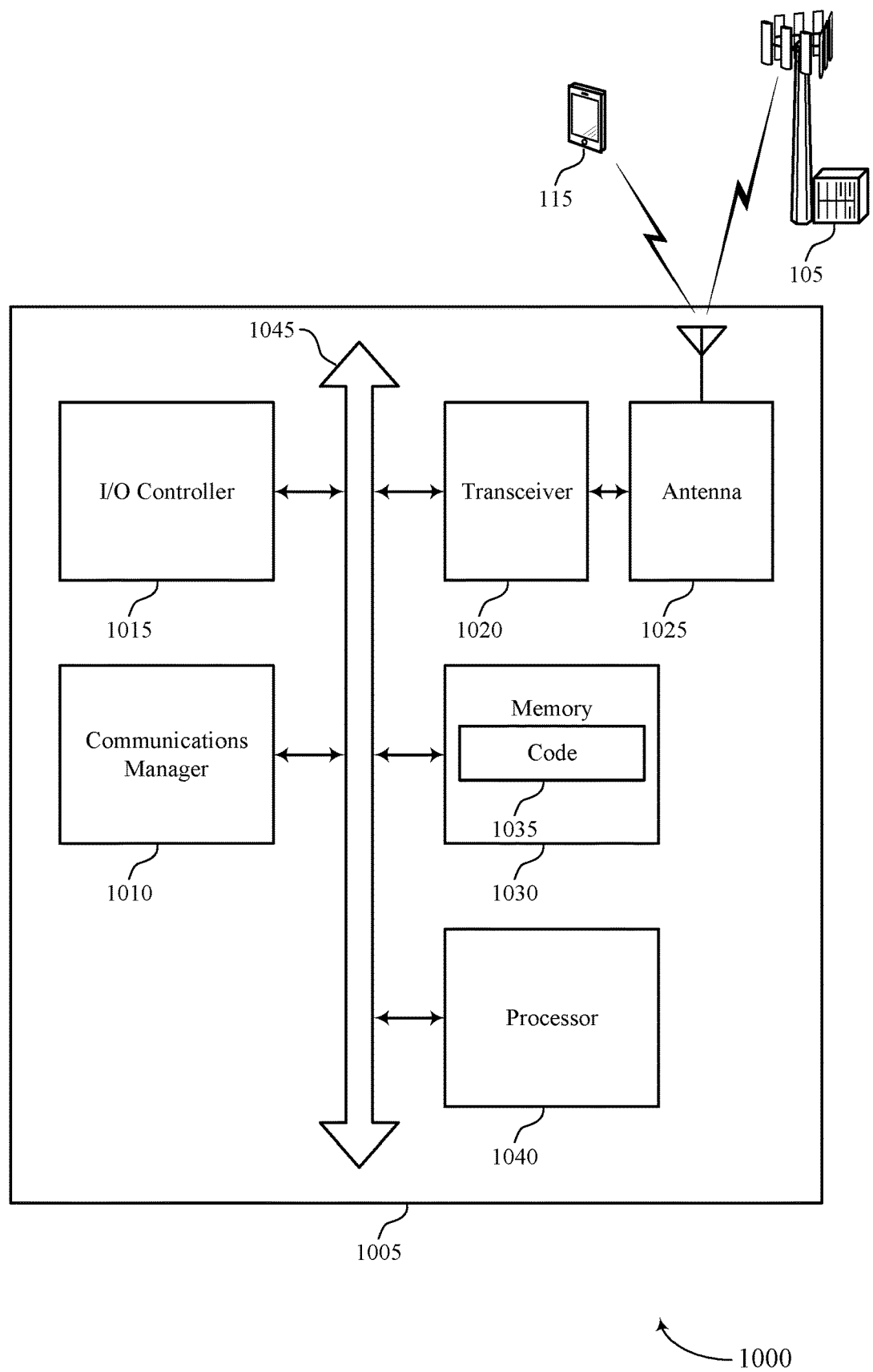
FIG. 10 shows a diagram of a system including a device that supports spatial reuse for sidelink communications in accordance with aspects of the present disclosure.

FIG. 10 shows a diagram of a system 1000 including a device 1005 that supports spatial reuse for sidelink communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify scheduling information for a sidelink shared channel between the first UE and a second UE and transmit a sidelink control message indicating the scheduling information and a set of reserved resources for subsequent sidelink communications for the first UE, where the sidelink control message includes a reuse allowance indicator that indicates whether the set of reserved resources is available for spatial reuse by one or more UEs. The communications manager 1010 may also monitor a set of sidelink resources for a sidelink control message from a first UE, receive the sidelink control message from the first UE based on the monitoring, where the sidelink control message includes a set of reserved resources for a sidelink shared channel between the first UE and a second UE, and a reuse allowance indicator that indicates whether the set of reserved resources is available for spatial reuse by the third UE, and perform a sidelink communication based on the reuse allowance indicator.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting spatial reuse for sidelink communications).

The code 1035 may include instructions to implement aspects of the present disclosure, including instructions to support wireless communication. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
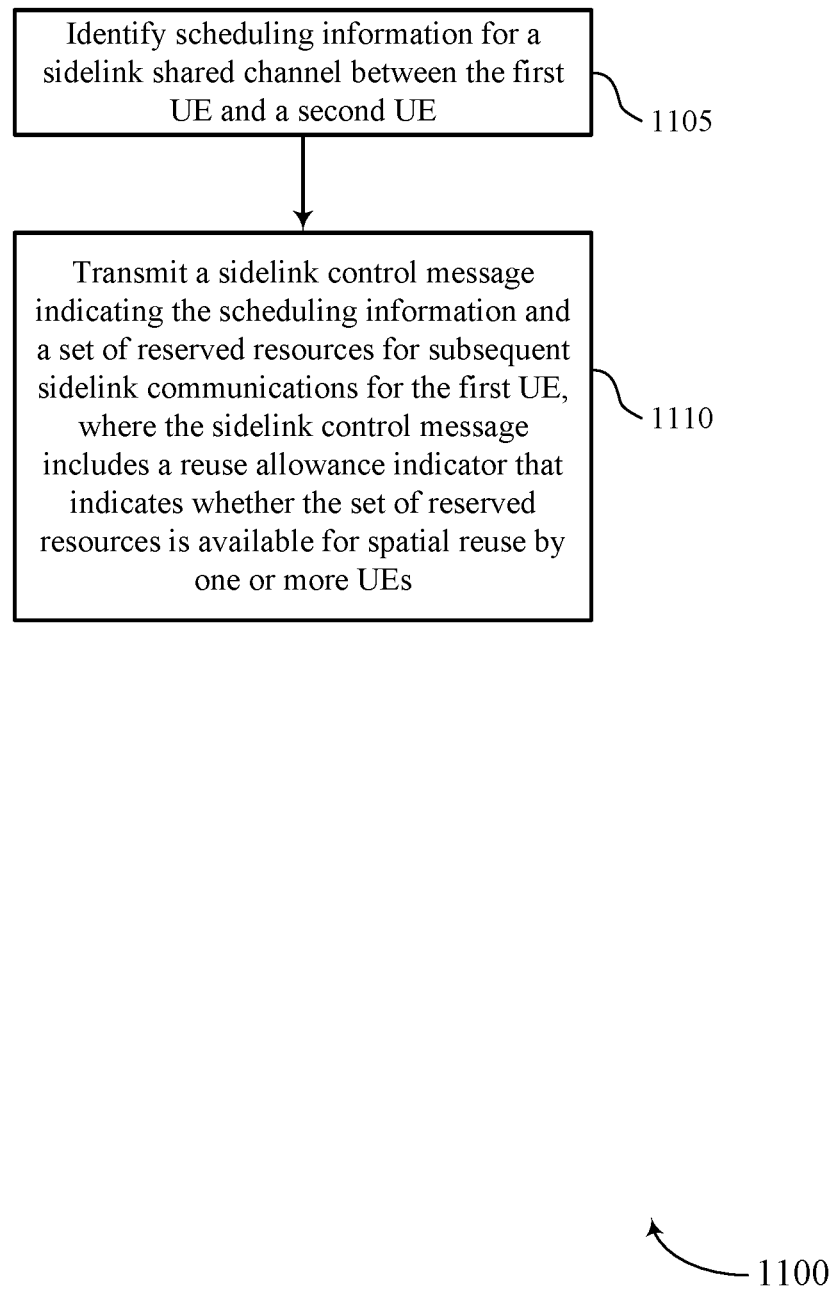
FIGS. 11 through 15 show flowcharts illustrating methods that support spatial reuse for sidelink communications in accordance with aspects of the present disclosure.

FIG. 11 shows a flowchart illustrating a method 1100 that supports spatial reuse for sidelink communications in accordance with aspects of the present disclosure. The operations of method 1100 may be implemented by a UE 115 or its components as described herein. For example, the operations of method 1100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1105, the UE may identify scheduling information for a sidelink shared channel between the first UE and a second UE. The operations of 1105 may be performed according to the methods described herein. In some examples, aspects of the operations of 1105 may be performed by a scheduling information component as described with reference to FIGS. 7 through 10.

At 1110, the UE may transmit a sidelink control message indicating the scheduling information and a set of reserved resources for subsequent sidelink communications for the first UE, where the sidelink control message includes a reuse allowance indicator that indicates whether the set of reserved resources is available for spatial reuse by one or more UEs. The operations of 1110 may be performed according to the methods described herein. In some examples, aspects of the operations of 1110 may be performed by a control message transmitter as described with reference to FIGS. 7 through 10.

Figure 12:
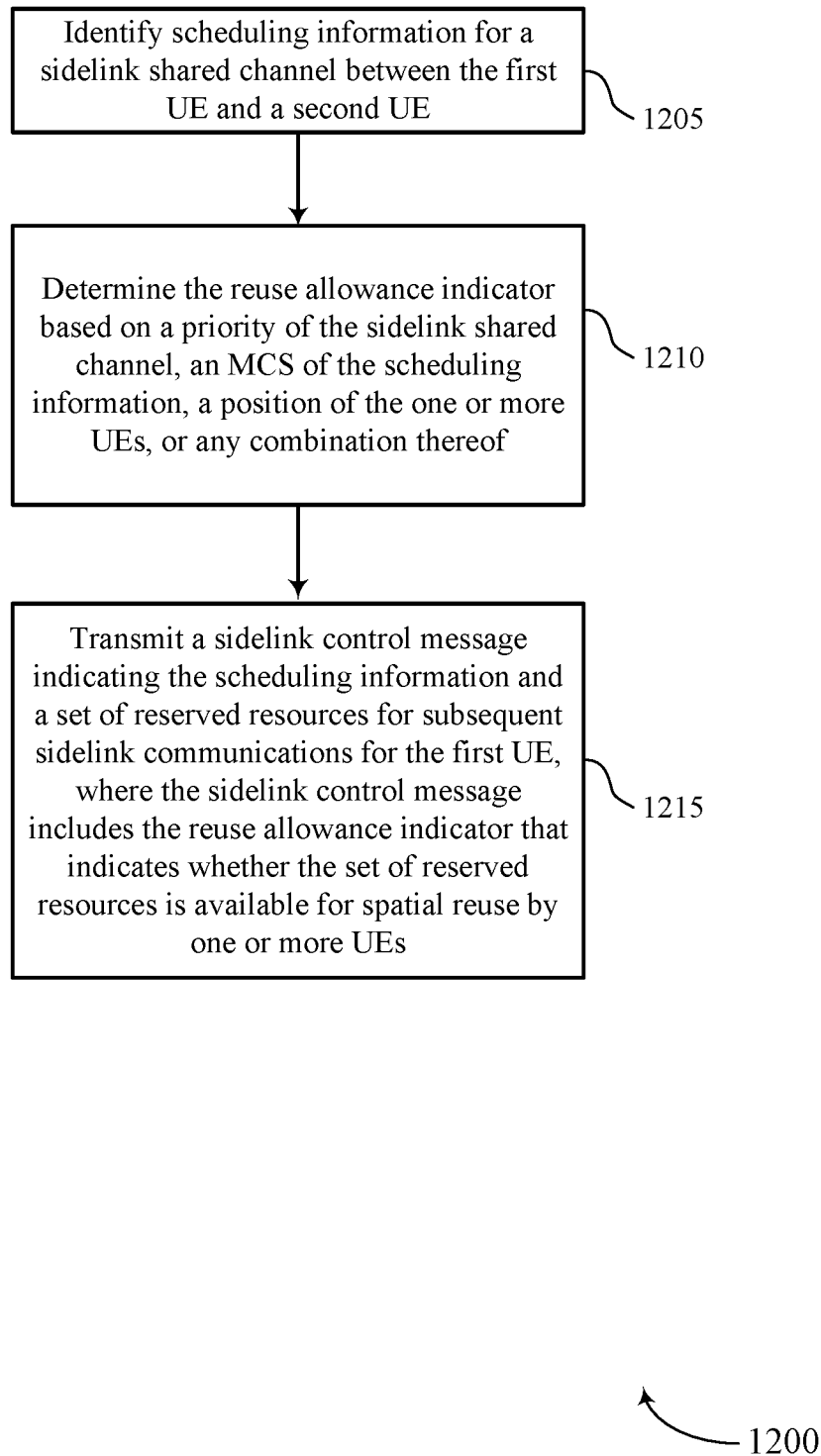

FIG. 12 shows a flowchart illustrating a method 1200 that supports spatial reuse for sidelink communications in accordance with aspects of the present disclosure. The operations of method 1200 may be implemented by a UE 115 or its components as described herein. For example, the operations of method 1200 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1205, the UE may identify scheduling information for a sidelink shared channel between the first UE and a second UE. The operations of 1205 may be performed according to the methods described herein. In some examples, aspects of the operations of 1205 may be performed by a scheduling information component as described with reference to FIGS. 7 through 10.

At 1210, the UE may determine a reuse allowance indicator based on a priority of the sidelink shared channel, an MCS of the scheduling information, a position of the one or more UEs, or any combination thereof. The operations of 1210 may be performed according to the methods described herein. In some examples, aspects of the operations of 1210 may be performed by a reuse allowance component as described with reference to FIGS. 7 through 10.

At 1215, the UE may transmit a sidelink control message indicating the scheduling information and a set of reserved resources for subsequent sidelink communications for the first UE, where the sidelink control message includes the reuse allowance indicator that indicates whether the set of reserved resources is available for spatial reuse by one or more UEs. The operations of 1215 may be performed according to the methods described herein. In some examples, aspects of the operations of 1215 may be performed by a control message transmitter as described with reference to FIGS. 7 through 10.

Figure 13:
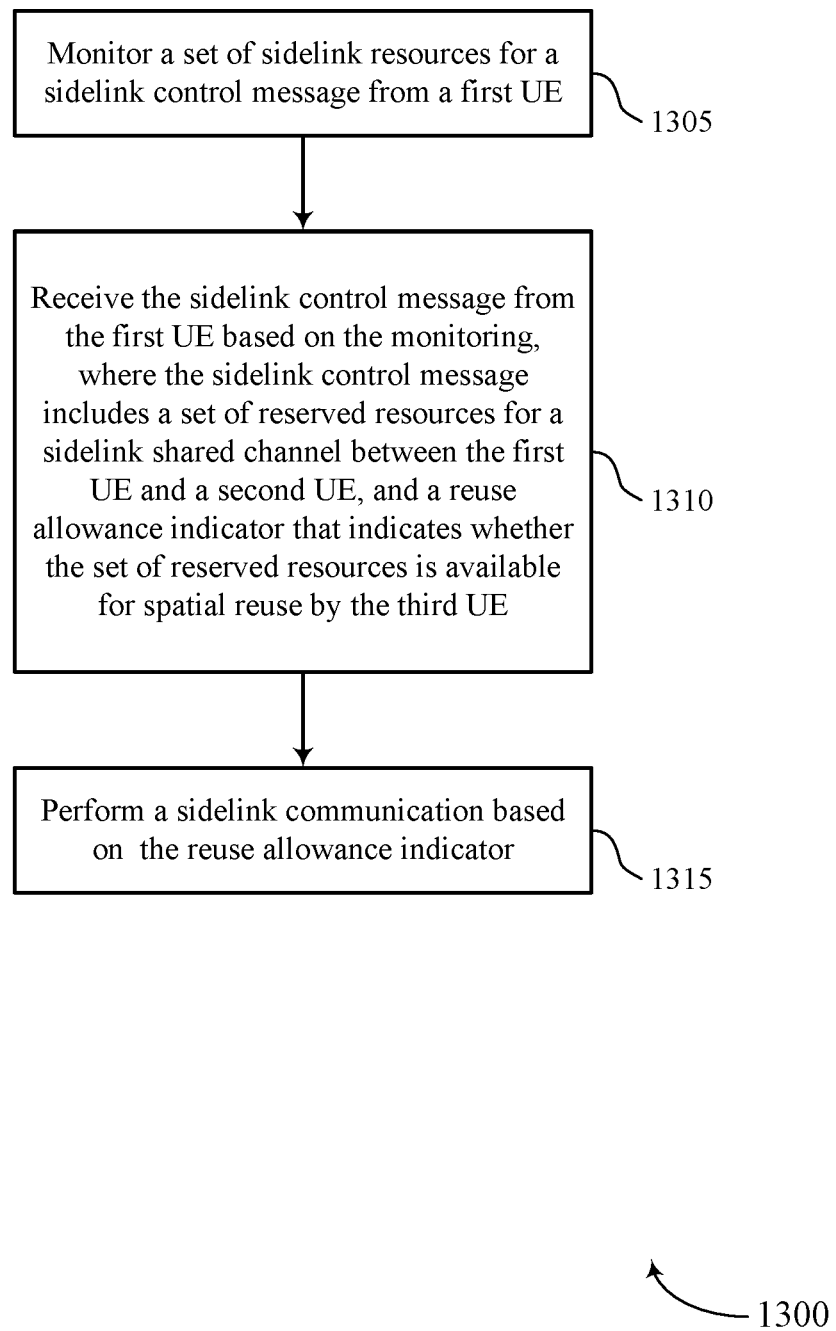

FIG. 13 shows a flowchart illustrating a method 1300 that supports spatial reuse for sidelink communications in accordance with aspects of the present disclosure. The operations of method 1300 may be implemented by a UE 115 or its components as described herein. For example, the operations of method 1300 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1305, the UE may monitor a set of sidelink resources for a sidelink control message from a first UE. The operations of 1305 may be performed according to the methods described herein. In some examples, aspects of the operations of 1305 may be performed by a control message receiver as described with reference to FIGS. 7 through 10.

At 1310, the UE may receive the sidelink control message from the first UE based on the monitoring, where the sidelink control message includes a set of reserved resources for a sidelink shared channel between the first UE and a second UE, and a reuse allowance indicator that indicates whether the set of reserved resources is available for spatial reuse by the third UE. The operations of 1310 may be performed according to the methods described herein. In some examples, aspects of the operations of 1310 may be performed by a control message receiver as described with reference to FIGS. 7 through 10.

At 1315, the UE may perform a sidelink communication based on the reuse allowance indicator. The operations of 1315 may be performed according to the methods described herein. In some examples, aspects of the operations of 1315 may be performed by a sidelink communication component as described with reference to FIGS. 7 through 10.

Figure 14:
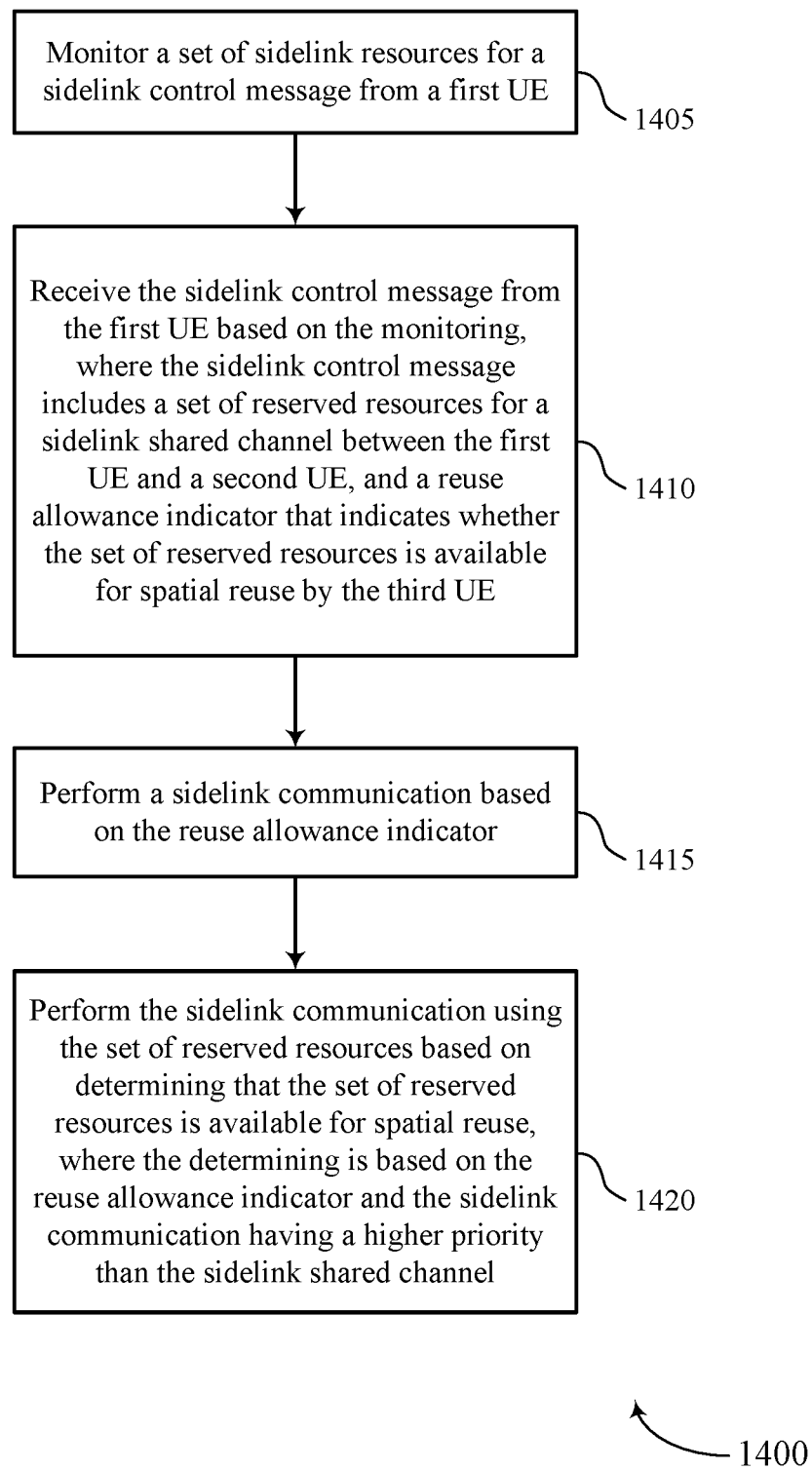

FIG. 14 shows a flowchart illustrating a method 1400 that supports spatial reuse for sidelink communications in accordance with aspects of the present disclosure. The operations of method 1400 may be implemented by a UE 115 or its components as described herein. For example, the operations of method 1400 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1405, the UE may monitor a set of sidelink resources for a sidelink control message from a first UE. The operations of 1405 may be performed according to the methods described herein. In some examples, aspects of the operations of 1405 may be performed by a control message receiver as described with reference to FIGS. 7 through 10.

At 1410, the UE may receive the sidelink control message from the first UE based on the monitoring, where the sidelink control message includes a set of reserved resources for a sidelink shared channel between the first UE and a second UE, and a reuse allowance indicator that indicates whether the set of reserved resources is available for spatial reuse by the third UE. The operations of 1410 may be performed according to the methods described herein. In some examples, aspects of the operations of 1410 may be performed by a control message receiver as described with reference to FIGS. 7 through 10.

At 1415, the UE may perform a sidelink communication based on the reuse allowance indicator. The operations of 1415 may be performed according to the methods described herein. In some examples, aspects of the operations of 1415 may be performed by a sidelink communication component as described with reference to FIGS. 7 through 10.

At 1420, the UE may perform the sidelink communication using the set of reserved resources based on determining that the set of reserved resources is available for spatial reuse, where the determining is based on the reuse allowance indicator and the sidelink communication having a higher priority than the sidelink shared channel. The operations of 1420 may be performed according to the methods described herein. In some examples, aspects of the operations of 1420 may be performed by a sidelink communication component as described with reference to FIGS. 7 through 10.

Figure 15:
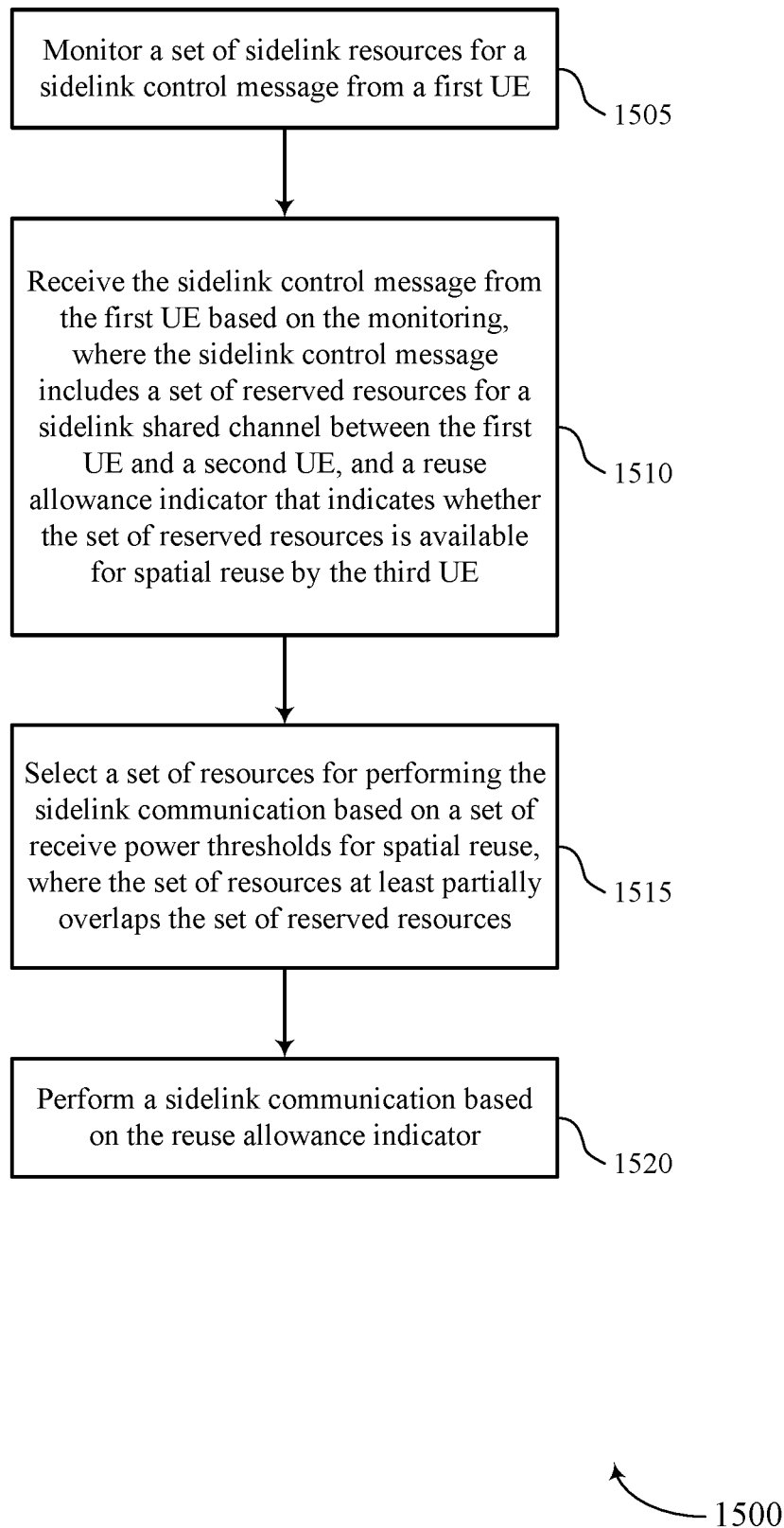

FIG. 15 shows a flowchart illustrating a method 1500 that supports spatial reuse for sidelink communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may monitor a set of sidelink resources for a sidelink control message from a first UE. The operations of 1505 may be performed according to the methods described herein. In some examples, aspects of the operations of 1505 may be performed by a control message receiver as described with reference to FIGS. 7 through 10.

At 1510, the UE may receive the sidelink control message from the first UE based on the monitoring, where the sidelink control message includes a set of reserved resources for a sidelink shared channel between the first UE and a second UE, and a reuse allowance indicator that indicates whether the set of reserved resources is available for spatial reuse by the third UE. The operations of 1510 may be performed according to the methods described herein. In some examples, aspects of the operations of 1510 may be performed by a control message receiver as described with reference to FIGS. 7 through 10.

At 1515, the UE may select a set of resources for performing the sidelink communication based on a set of receive power thresholds for spatial reuse, where the set of resources at least partially overlaps the set of reserved resources. In some examples, each of the set of receive power thresholds may correspond to a respective set of transmit power parameters and the sidelink communication may be performed based on the respective set of transmit power parameters. The operations of 1515 may be performed according to the methods described herein. In some examples, aspects of the operations of 1515 may be performed by a resource selection component as described with reference to FIGS. 7 through 10.

At 1520, the UE may perform a sidelink communication based on the reuse allowance indicator. The operations of 1520 may be performed according to the methods described herein. In some examples, aspects of the operations of 1520 may be performed by a sidelink communication component as described with reference to FIGS. 7 through 10.

The following provides an overview of aspects of the present disclosure:

Aspect 1: A method for wireless communication at a first UE, comprising: identifying scheduling information for a sidelink shared channel between the first UE and a second UE; and transmitting a sidelink control message indicating the scheduling information and a set of reserved resources for subsequent sidelink communications for the first UE, wherein the sidelink control message comprises a reuse allowance indicator that indicates whether the set of reserved resources is available for spatial reuse by one or more UEs.

Aspect 2: The method of aspect 1, further comprising: determining the reuse allowance indicator based at least in part on a priority of the sidelink shared channel, an MCS of the scheduling information, a position of the one or more UEs, or any combination thereof.

Aspect 3: The method of any of aspects 1 through 2, wherein: the reuse allowance indicator indicates a first set of transmit power parameters for reuse of the set of reserved resources according to a first receive power threshold and a second set of transmit power parameters for reuse of the set of reserved resources according to a second receive power threshold and each of the first and second sets of transmit power parameters comprises an allowed interference parameter and a margin parameter.

Aspect 4: The method of aspect 3, wherein the first and second sets of transmit power parameters are based on a coverage difference between the sidelink control message and the sidelink shared channel.

Aspect 5: The method of any of aspects 1 through 4, further comprising: identifying one or more groups of UEs, wherein each of the one or more groups of UEs is configured a respective set of spatial reuse rules for reusing the set of reserved resources, and wherein the reuse allowance indicator comprises different sets of spatial reuse parameters for each of the one or more groups of UEs.

Aspect 6: The method of any of aspects 1 through 5, further comprising: transmitting an indication of a zone ID for a zone of the first UE based at least in part on a location of the first UE, wherein the indication of the zone ID is included in the sidelink control message or a second sidelink control message, and wherein the reuse allowance indicator is based at least in part on the zone of the first UE.

Aspect 7: The method of any of aspects 1 through 6, further comprising: transmitting an indication of a zone ID for a zone of the second UE based at least in part on a location of the second UE, wherein the indication of the zone ID is included in the sidelink control message or a second sidelink control message, and wherein the reuse allowance indicator is based at least in part on the zone of the second UE.

Aspect 8: The method of any of aspects 1 through 7, further comprising: transmitting the sidelink shared channel to the second UE in accordance with the scheduling information; receiving a feedback message from the second UE for the sidelink shared channel; and updating a set of spatial reuse parameters for reusing the set of reserved resources based at least in part on the feedback message from the second UE.

Aspect 9: The method of any of aspects 1 through 8, wherein the reuse allowance indicator comprises a set of bits indicating whether the set of reserved resources are available for spatial reuse by the one or more UEs; and the set of bits indicates a set of transmit power parameters for the set of reserved resources available for spatial reuse.

Aspect 10: The method of any of aspects 1 through 9, further comprising: transmitting a set of spatial reuse parameters in a second sidelink control message after transmitting the sidelink control message, the set of spatial reuse parameters comprising a zone ID of the first UE or the second UE, a maximum transmit power for spatial reuse, a transmit power offset, and group information for one or more groups of UEs for reusing the set of reserved resources, wherein the second sidelink control message is associated with a format specific to sidelink spatial reuse.

Aspect 11: The method of any of aspects 1 through 9, further comprising: transmitting a set of spatial reuse parameters in the sidelink shared channel, the set of spatial reuse parameters comprising a zone ID of the first UE or the second UE, a maximum transmit power for spatial reuse, and group information for one or more groups of UEs for reusing the set of reserved resources, wherein the set of spatial reuse parameters are indicated by a spatial reuse IE in the sidelink shared channel.

Aspect 12: A method for wireless communications at a third UE, comprising: monitoring a set of sidelink resources for a sidelink control message from a first UE; receiving the sidelink control message from the first UE based at least in part on the monitoring, wherein the sidelink control message comprises a set of reserved resources for a sidelink shared channel between the first UE and a second UE, and a reuse allowance indicator that indicates whether the set of reserved resources is available for spatial reuse by the third UE; and performing a sidelink communication based at least in part on the reuse allowance indicator.

Aspect 13: The method of aspect 12, further comprising: refraining from performing a communication via the set of reserved resources based at least in part on determining that the set of reserved resources are unavailable for spatial reuse, the determining based at least in part on the reuse allowance indicator, wherein the sidelink communication is performed using a set of resources different from the set of reserved resources.

Aspect 14: The method of aspect 13, further comprising: determining that the set of reserved resources is unavailable based at least in part on the sidelink communication having a lower priority than the sidelink shared channel.

Aspect 15: The method of aspect 13, further comprising: determining that the set of reserved resources is unavailable based at least in part on the third UE being in a different group than the first UE or the second UE.

Aspect 16: The method of aspect 13, further comprising: determining that the set of reserved resources is unavailable based at least in part on a zone ID of the third UE, a zone ID of the first UE, a zone ID of the second UE, or a combination thereof, wherein the zone ID of the first UE or the zone ID of the second UE is included in the sidelink control message.

Aspect 17: The method of aspect 12, further comprising: performing the sidelink communication using the set of reserved resources based at least in part on determining that the set of reserved resources is available for spatial reuse, wherein the determining is based at least in part on the reuse allowance indicator and the sidelink communication having a higher priority than the sidelink shared channel.

Aspect 18: The method of aspect 17, wherein: the reuse allowance indicator indicates a first set of transmit power parameters for reuse of the set of reserved resources according to a first receive power threshold and a second set of transmit power parameters for reuse of the set of reserved resources according to a second receive power threshold; and a set of transmit power parameters for the sidelink communication is based at least in part on the reuse allowance indicator and one or more measurements of the third UE.

Aspect 19: The method of aspect 18, wherein the set of transmit power parameters is determined based at least in part on a coverage difference between the sidelink control message and the sidelink shared channel.

Aspect 20: The method of any of aspects 12 through 19, further comprising: selecting a set of resources for performing the sidelink communication based at least in part on a set of receive power thresholds for spatial reuse, wherein: the set of resources at least partially overlaps the set of reserved resources; each of the set of receive power thresholds corresponds to a respective set of transmit power parameters; and the sidelink communication is performed based at least in part on the respective sets of transmit power parameters.

Aspect 21: The method of any of aspects 12 through 20, further comprising: identifying a group of the first UE based at least in part on the sidelink control message or a second sidelink control message from the first UE; and selecting a set of resources for performing the sidelink communication based at least in part on the group of the first UE, wherein the set of resources at least partially overlaps the set of reserved resources based at least in part on the third UE being in a same group as the first UE.

Aspect 22: The method of aspect 21, further comprising: transmitting, to the first UE, a request to join the group of the first UE; and receiving, from the first UE or a group leader of the group of the first UE, a response indicating the third UE to join the group of the first UE.

Aspect 23: The method of any of aspects 12 through 22, further comprising: identifying a zone ID associated with the first UE or the second UE based at least in part on the sidelink control message or a second sidelink control message from the first UE; and selecting a set of resources for performing the sidelink communication based at least in part on a zone of the third UE and the zone ID associated with the first UE or the second UE, the zone of the third UE based at least in part on a location of the third UE.

Aspect 24: The method of aspect 23, further comprising: estimating a distance between the third UE and the first UE based at least in part on the sidelink control message; and performing the sidelink communication in accordance with a set of transmit power parameters, the set of transmit power parameters based at least in part on the distance.

Aspect 25: The method of any of aspects 12 through 24, further comprising: receiving a set of spatial reuse parameters in a second sidelink control message after receiving the sidelink control message, the set of spatial reuse parameters comprising a zone ID of the first UE or the second UE, a maximum transmit power for spatial reuse, a transmit power offset, group information for one or more groups of UEs for reusing the set of reserved resources; and performing the sidelink communication in accordance with the set of spatial reuse parameters using a set of resources that at least partially overlaps with the set of reserved resources.

Aspect 26: The method of any of aspects 12 through 24, further comprising: receiving a set of spatial reuse parameters in the sidelink shared channel, the set of spatial reuse parameters comprising a zone ID of the first UE or the second UE, a maximum transmit power for spatial reuse, group information for one or more groups of UEs for reusing the set of reserved resources; and performing the sidelink communication in accordance with the set of spatial reuse parameters using a set of resources that at least partially overlaps with the set of reserved resources.

Aspect 27: An apparatus for wireless communication at a first UE, comprising a processor; memory coupled with the processor; and instructions stored in the memory and executable by the processor to cause the apparatus to perform a method of any of aspects 1 through 11.

Aspect 28: An apparatus for wireless communication at a first UE, comprising at least one means for performing a method of any of aspects 1 through 11.

Aspect 29: A non-transitory computer-readable medium storing code for wireless communication at a first UE, the code comprising instructions executable by a processor to perform a method of any of aspects 1 through 11.

Aspect 30: An apparatus for wireless communications at a third UE, comprising a processor; memory coupled with the processor; and instructions stored in the memory and executable by the processor to cause the apparatus to perform a method of any of aspects 12 through 26.

Aspect 31: An apparatus for wireless communications at a third UE, comprising at least one means for performing a method of any of aspects 12 through 26.

Aspect 32: A non-transitory computer-readable medium storing code for wireless communications at a third UE, the code comprising instructions executable by a processor to perform a method of any of aspects 12 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
transmitting, via one or more sidelink communication resources, a sidelink control message indicating scheduling information for a sidelink shared channel between the first UE and a second UE and a set of reserved resources for subsequent sidelink communications for the first UE, wherein the sidelink control message comprises a reuse allowance indicator that indicates whether the set of reserved resources is available for spatial reuse by one or more UEs; and
transmitting an indication of one or more spatial reuse parameters for reusing, by the one or more UEs, the set of reserved resources.

2. The method of claim 1,
wherein the reuse allowance indicator is based at least in part on a priority of the sidelink shared channel, a modulation and coding scheme of the scheduling information, a position of the one or more UEs, or any combination thereof.

3. The method of claim 1, wherein:
the reuse allowance indicator, the one or more spatial reuse parameters, or both, indicate a first set of transmit power parameters for reuse of the set of reserved resources according to a first receive power threshold and a second set of transmit power parameters for reuse of the set of reserved resources according to a second receive power threshold; and
each of the first and second sets of transmit power parameters comprises an allowed interference parameter and a margin parameter.

4. The method of claim 3, wherein the first and second sets of transmit power parameters are based at least in part on a coverage difference between the sidelink control message and the sidelink shared channel.

5. The method of claim 1,
wherein one or more groups of UEs are configured with respective sets of spatial reuse rules for reusing the set of reserved resources, and wherein the reuse allowance indicator, the indication, or both, comprise different sets of the one or more spatial reuse parameters for each of the one or more groups of UEs.

6. The method of claim 1, further comprising:
transmitting, via the indication, a zone identifier for a zone of the first UE based at least in part on a location of the first UE, wherein the zone identifier is included in the sidelink control message or a second sidelink control message, and wherein the reuse allowance indicator is based at least in part on the zone of the first UE.

7. The method of claim 1, further comprising:
transmitting, via the indication, zone identifier for a zone of the second UE based at least in part on a location of the second UE, wherein the zone identifier is included in the sidelink control message or a second sidelink control message, and wherein the reuse allowance indicator is based at least in part on the zone of the second UE.

8. The method of claim 1, further comprising:
transmitting the sidelink shared channel to the second UE in accordance with the scheduling information;
receiving a feedback message from the second UE for the sidelink shared channel; and
updating the one or more spatial reuse parameters for reusing the set of reserved resources based at least in part on the feedback message from the second UE.

9. The method of claim 1, wherein:
the reuse allowance indicator comprises a set of bits indicating whether the set of reserved resources are available for spatial reuse by the one or more UEs; and
the set of bits indicates a set of transmit power parameters for the set of reserved resources available for spatial reuse.

10. The method of claim 1, wherein transmitting the indication comprises:
transmitting, after transmitting the sidelink control message, a second sidelink control message comprising the one or more spatial reuse parameters, the one or more spatial reuse parameters comprising a zone identifier of the first UE or the second UE, a maximum transmit power for spatial reuse, a transmit power offset, and group information for one or more groups of UEs for reusing the set of reserved resources, wherein the second sidelink control message is associated with a format specific to sidelink spatial reuse.

11. The method of claim 1, wherein transmitting the indication comprises:
transmitting the indication of the one or more spatial reuse parameters in the sidelink shared channel, the one or more spatial reuse parameters comprising a zone identifier of the first UE or the second UE, a maximum transmit power for spatial reuse, and group information for one or more groups of UEs for reusing the set of reserved resources, wherein the one or more spatial reuse parameters are indicated by a spatial reuse information element in the sidelink shared channel.

12. A method for wireless communications at a third user equipment (UE), comprising:
monitoring one or more sidelink communication resources for a sidelink control message from a first UE;
receiving, via the one or more sidelink communication resources, the sidelink control message from the first UE based at least in part on the monitoring, wherein the sidelink control message comprises a set of reserved resources for a sidelink shared channel between the first UE and a second UE, and a reuse allowance indicator that indicates whether the set of reserved resources is available for spatial reuse by the third UE;
receiving an indication of one or more spatial reuse parameters for reusing, by the third UE, of the set of reserved resources; and
performing a sidelink communication based at least in part on the reuse allowance indicator and the indication of the one or more spatial reuse parameters.

13. The method of claim 12, further comprising:
refraining from performing a communication via the set of reserved resources based at least in part on determining that the set of reserved resources are unavailable for spatial reuse, the determining based at least in part on the reuse allowance indicator and the indication of the one or more spatial reuse parameters, wherein the sidelink communication is performed using a set of resources different from the set of reserved resources.

14. The method of claim 13, further comprising:
determining that the set of reserved resources is unavailable based at least in part on the sidelink communication having a lower priority than the sidelink shared channel.

15. The method of claim 13, further comprising:
determining that the set of reserved resources is unavailable based at least in part on the third UE being in a different group than the first UE or the second UE.

16. The method of claim 13, further comprising:
determining that the set of reserved resources is unavailable based at least in part on a zone identifier of the third UE, a zone identifier of the first UE, a zone identifier of the second UE, or a combination thereof, wherein the zone identifier of the first UE or the zone identifier of the second UE is included in the sidelink control message, the indication of the one or more spatial reuse parameters, or both.

17. The method of claim 12, further comprising:
performing the sidelink communication using the set of reserved resources based at least in part on determining that the set of reserved resources is available for spatial reuse,
wherein the determining is based at least in part on the reuse allowance indicator, the indication of the one or more spatial reuse parameters, and the sidelink communication having a higher priority than the sidelink shared channel.

18. The method of claim 17, wherein:
the reuse allowance indicator, the one or more spatial reuse parameters, or both, indicate a first set of transmit power parameters for reuse of the set of reserved resources according to a first receive power threshold and a second set of transmit power parameters for reuse of the set of reserved resources according to a second receive power threshold; and
a set of transmit power parameters for the sidelink communication is based at least in part on the reuse allowance indicator, the one or more spatial reuse parameters, and one or more measurements of the third UE.

19. The method of claim 18, wherein the set of transmit power parameters is determined based at least in part on a coverage difference between the sidelink control message and the sidelink shared channel.

20. The method of claim 12, further comprising:
selecting a set of resources for performing the sidelink communication based at least in part on a set of receive power thresholds for spatial reuse, wherein:
the set of resources at least partially overlaps the set of reserved resources;
each of the set of receive power thresholds corresponds to a respective set of transmit power parameters; and
the sidelink communication is performed based at least in part on the respective sets of transmit power parameters.

21. The method of claim 12, further comprising:
identifying a group of the first UE based at least in part on the sidelink control message or a second sidelink control message from the first UE; and
selecting a set of resources for performing the sidelink communication based at least in part on the group of the first UE, wherein the set of resources at least partially overlaps the set of reserved resources based at least in part on the third UE being in a same group as the first UE.

22. The method of claim 21, further comprising:
transmitting, to the first UE, a request to join the group of the first UE; and
receiving, from the first UE or a group leader of the group of the first UE, a response indicating the third UE to join the group of the first UE.

23. The method of claim 12, further comprising:
identifying a zone identifier associated with the first UE or the second UE based at least in part on the sidelink control message or a second sidelink control message from the first UE; and
selecting a set of resources for performing the sidelink communication based at least in part on a zone of the third UE and the zone identifier associated with the first UE or the second UE, the zone of the third UE based at least in part on a location of the third UE.

24. The method of claim 23, further comprising:
estimating a distance between the third UE and the first UE based at least in part on the sidelink control message; and
performing the sidelink communication in accordance with a set of transmit power parameters, the set of transmit power parameters based at least in part on the distance.

25. The method of claim 12, wherein receiving the indication of the one or more spatial reuse parameters comprises:
receiving, after receiving the sidelink control message, a second sidelink control message comprising the indication of the one or more spatial reuse parameters, the one or more spatial reuse parameters comprising a zone identifier of the first UE or the second UE, a maximum transmit power for spatial reuse, a transmit power offset, group information for one or more groups of UEs for reusing the set of reserved resources; and
performing the sidelink communication in accordance with the one or spatial reuse parameters using a set of resources that at least partially overlaps with the set of reserved resources.

26. The method of claim 12, wherein receiving the indication of the one or more spatial reuse parameters comprises:
receiving the indication of the one or more spatial reuse parameters in the sidelink shared channel, the one or more spatial reuse parameters comprising a zone identifier of the first UE or the second UE, a maximum transmit power for spatial reuse, group information for one or more groups of UEs for reusing the set of reserved resources; and
performing the sidelink communication in accordance with the one or more spatial reuse parameters using a set of resources that at least partially overlaps with the set of reserved resources.

27. An apparatus for wireless communication at a first user equipment (UE), comprising:
a processor,
memory coupled with the processor; and
instructions stored in the memory and executable by the processor to cause the apparatus to:
transmit, via one or more sidelink communication resources, a sidelink control message indicating scheduling information for a sidelink shared channel between the first UE and a second UE and a set of reserved resources for subsequent sidelink communications for the first UE, wherein the sidelink control message comprises a reuse allowance indicator that indicates whether the set of reserved resources is available for spatial reuse by one or more UEs; and
transmit an indication of one or more spatial reuse parameters for reuse, by the one or more UEs, of the set of reserved resources.

28. The apparatus of claim 27, wherein
the reuse allowance indicator is based at least in part on a priority of the sidelink shared channel, a modulation and coding scheme of the scheduling information, a position of the one or more UEs, or any combination thereof.

29. An apparatus for wireless communications at a third user equipment (UE), comprising:
a processor,
memory coupled with the processor; and
instructions stored in the memory and executable by the processor to cause the apparatus to:
monitor one or more sidelink communication resources for a sidelink control message from a first UE;
receive, via the one or more sidelink communication resources, the sidelink control message from the first UE based at least in part on the monitoring, wherein the sidelink control message comprises a set of reserved resources for a sidelink shared channel between the first UE and a second UE, and a reuse allowance indicator that indicates whether the set of reserved resources is available for spatial reuse by the third UE;
receive an indication of one or more spatial reuse parameters for reuse, by the third UE, of the set of reserved resources; and
perform a sidelink communication based at least in part on the reuse allowance indicator and the indication of the one or more spatial reuse parameters.

30. The apparatus of claim 29, wherein the instructions are further executable by the processor to cause the apparatus to:
refrain from performing a communication via the set of reserved resources based at least in part on determining that the set of reserved resources are unavailable for spatial reuse, the determining based at least in part on the reuse allowance indicator and the indication of the one or more spatial reuse parameters, wherein the sidelink communication is performed using a set of resources different from the set of reserved resources.

\* \* \* \* \*